US012012182B2

(12) United States Patent
Swiatek

(10) Patent No.: US 12,012,182 B2
(45) Date of Patent: Jun. 18, 2024

(54) SURF THRUST SYSTEM

(71) Applicant: Go Surf Assist, LLC, Wichita Falls, TX (US)

(72) Inventor: Ryan Swiatek, Wichita Falls, TX (US)

(*) Notice: Subject to any disclaimer, the term of this patent is extended or adjusted under 35 U.S.C. 154(b) by 333 days.

(21) Appl. No.: 17/486,819

(22) Filed: Sep. 27, 2021

(65) Prior Publication Data

US 2022/0097813 A1    Mar. 31, 2022

Related U.S. Application Data

(60) Provisional application No. 63/198,046, filed on Sep. 25, 2020.

(51) Int. Cl.
| | |
|---|---|
| *B63B 34/70* | (2020.01) |
| *B63H 5/125* | (2006.01) |
| *B63H 5/15* | (2006.01) |
| *B63H 1/28* | (2006.01) |

(52) U.S. Cl.
CPC ............ *B63B 34/70* (2020.02); *B63H 5/125* (2013.01); *B63H 5/15* (2013.01); *B63H 2001/283* (2013.01); *B63H 2005/1254* (2013.01)

(58) Field of Classification Search
CPC ...... A63G 31/007; B63B 34/70; B63H 5/125; B63H 5/15
USPC ........................................... 472/128
See application file for complete search history.

(56) References Cited

U.S. PATENT DOCUMENTS

| | | | |
|---|---|---|---|
| 5,787,835 A * | 8/1998 | Remnant ................ | B63B 1/32 |
| | | | 114/271 |
| 10,308,336 B1 * | 6/2019 | Vermeulen ............. | B63B 32/60 |
| 2017/0239580 A1 * | 8/2017 | Immonen ............. | E04H 4/0006 |
| 2019/0368544 A1 * | 12/2019 | Julliand ................ | F16C 33/26 |

\* cited by examiner

*Primary Examiner* — Kien T Nguyen
(74) *Attorney, Agent, or Firm* — Shannon Warren

(57) ABSTRACT

A thruster assembly to create shaped waves in a water behind a boat for water sports, such as wake surfing. The thruster assembly comprises one or more thrusting channels, an outer body the outer body comprises a round surface in the form of a circular or elliptical cross-section. The outer body comprises an elongated elliptical cross-section being wider than it is tall. A thruster portion comprises a width, a height, and a depth. The outer body comprises an outer surface and an inner surface. The outer body comprises a round surface in the form of a circular or elliptical cross-section. The outer body comprises an elongated elliptical cross-section being wider than it is tall.

19 Claims, 20 Drawing Sheets

SURF THRUST SYSTEM

CROSS-REFERENCE TO RELATED APPLICATIONS

This application claims benefit to U.S. provisional patent application 63/198,046 filed 2020 Sep. 25.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

No prior art is known to the Applicant

BRIEF SUMMARY OF THE INVENTION

A thruster assembly to create shaped waves in a water behind a boat for water sports, such as wake surfing. Said thruster assembly comprises a thruster portion. Said thruster assembly is configured to attach to a portion of said boat, such as a stern portion, a port side, a starboard side, or on a bottom portion of the hull. Said thruster portion comprises an outer body comprising a rounded shape being elliptical in cross-section. Said outer body comprises a width, a height, and a depth. Said outer body comprises an outer surface and an inner surface. Said outer body encloses an internal channel between a leading end and a trailing end. relative to a direction of travel for said boat in said water, said internal channel comprises said leading end and said trailing end. Said leading end and said trailing end are open and configured to direct the flow of water through said thruster portion as said thruster assembly is dragged through said water being attached to said boat. Said outer body comprises a top surface and a bottom surface, each being parts of said outer surface and a top inner surface and a lower inner surface being parts of said inner surface. Said leading end of said internal channel is configured to serve as an intake for said water and said trailing end is configured to expel said water out of said internal channel. Said thruster portion comprises one or more thrusting channels being arranged between said leading end and said trailing end. Said thruster portion is configured to be attached to said boat at a mounting angle relative to said direction of travel of said boat to alter a wake behind said boat. Said one or more thrusting channels comprise a plurality of channels formed by fluid directing channels within said outer body extending a portion of the distance between said leading end and said trailing end. Said width is greater than said height of said outer body. Said outer body comprises with a ratio of said width to said height being approximately one to four. An axial mounting assembly comprises a riser being being substantially cylindrical, and a pushing flap extending radially out from a central axis of said riser being. Said thruster assembly comprises a hinged plate, a hinge assembly, a hinge plate actuator receiver backet, a horizontal rotational axis, a vertical rotational axis, a horizontal rotation actuator. Said thruster portion is pivoted about said central axis by holding a portion of said riser being and pressing and pulling said pushing flap. Said hinge plate actuator receiver backet is attached to a top surface forward of said hinge assembly. Said hinged plate comprises a leading edge and a trailing edge. Said hinged plate is configured to further comprise a rotational aperture. Said rotational aperture comprises a hole being located proximate to said trailing edge and sized to rotateably hold a portion of said riser being of said axial mounting assembly, and allow said riser being to rotate about said central axis and said vertical rotational axis. A vertical rotation actuator is configured to selectively push and pull a rod between a plurality of lengths. Said plurality of lengths comprises at least a first length, a second length 804b, and a third length 804c. A vertical actuator to thruster linkage 716 is attached between said rod 802 and said pushing flap 506. Said vertical rotation actuator 712 is configured where extending said rod 802 between said plurality of lengths 804, said vertical actuator to thruster linkage 716 is configured to rotate said pushing flap 506 about said central axis 508 through a rotary path 806. Said vertical rotation actuator 712 is configured to rotate about a rear axis 726 and a curved attachment pin 728 to allow said rod 802 and said central axis 508 to move about said rotary path 806 without said vertical actuator to thruster linkage 716. Said curved attachment pin 728 is configured to selectively slide into a linkage aperture 600 of said pushing flap 506. Said thruster assembly 100 comprises said hinged plate 702, said hinge assembly 704, said hinge plate actuator receiver backet 706, said horizontal rotational axis 708, said vertical rotational axis 710, said vertical rotation actuator 712, and said vertical actuator to thruster linkage 716. Said hinged plate 702 is pivotably attached to a portion of said boat 102 using said hinge assembly 704. Said thruster assembly 100 and said hinged plate 702 are configured to rotate about said horizontal rotational axis 708 on said hinge assembly 704. Said hinge assembly 704 is configured to allow said thruster assembly 100 to be selectively removed or inserted into said water 104. Said vertical rotation actuator 712 is configured to selectively push and pull portions of said thruster portion 200. Said vertical rotation actuator 712 is configured to push and pull on said pushing flap 506 to cause said thruster portion 200 to selectively rotate about said central axis 508 and said vertical rotational axis 710. Said vertical rotation actuator 712 is rotateably attached to said pushing flap 506 with said vertical actuator to thruster linkage 716. Said vertical rotation actuator 712 is attached to said top surface 718 of said hinged plate 702. Said axial mounting assembly 502 comprises said riser being 504 being substantially cylindrical, and said pushing flap 506 extending radially out from said central axis 508 of said riser being 504. Said thruster assembly 100 comprises said hinged plate 702, said hinge assembly 704, said hinge plate actuator receiver backet 706, said horizontal rotational axis 708, said vertical rotational axis 710, said horizontal rotation actuator 714. Said thruster portion 200 is pivoted about said central axis 508 by holding a portion of said riser being 504 and pressing and pulling said pushing flap 506. Said hinge plate actuator receiver backet 706 is attached to said top surface 718 forward of said hinge assembly 704. Said hinged plate 702 comprises said leading edge 720 and said trailing edge 722. Said hinged plate 702 is configured to further comprise said rotational aperture 724. Said rotational aperture 724 comprises a hole being located proximate to said trailing edge 722 and sized to rotateably hold a portion of said riser being 504 of said axial mounting assembly 502, and allow said riser being 504 to rotate about said central axis 508 and said vertical rotational axis 710. Said thruster assembly 100 comprises said hinged plate 702, said hinge assembly 704, said hinge plate actuator receiver backet 706, said horizontal rotational axis 708, said vertical rotational axis 710, said vertical rotation actuator 712, and said vertical actuator to thruster linkage 716. Said hinged plate 702 is pivotably attached to a portion of said boat 102 using said hinge assembly 704. Said thruster assembly 100 and said hinged plate 702 are configured to rotate about said horizontal rotational axis 708 on said hinge assembly 704. Said hinge assembly 704 is configured to allow said thruster assembly 100 to be selectively removed or inserted into said water 104. Said vertical rotation actuator 712 is configured to selectively push and pull portions of said thruster portion 200. Said vertical rotation actuator 712 is configured to push and pull on said pushing flap 506 to cause said thruster portion 200 to selectively rotate about said central axis 508 and said vertical rotational axis 710. Said vertical rotation actuator 712 is rotateably attached to said pushing flap 506 with said vertical actuator to thruster linkage 716. Said vertical rotation actuator 712 is attached to said top surface 718 of said hinged plate 702. Said thruster assembly 100 is configured to rotate about said horizontal rotational axis 708 between one or more horizontal rotary configurations 1500 so as to engage or disengage said thruster portion 200 with said water 104 under a portion of said boat 102. Said horizontal rotation actuator 714 is configured to selectively push and pull on said hinge plate actuator receiver backet 706 to cause said hinged plate 702 to rotate about said hinge assembly 704 on said horizontal rotational axis 708.

Said thruster assembly 100 to create shaped waves in said water 104 behind said boat 102 for water sports, such as wake surfing. Said thruster assembly 100 comprises said thruster portion 200. Said thruster assembly 100 is configured to attach to a portion of said boat 102, such as said stern portion 700, said port side 2000, said starboard side 2002, or on a bottom portion of the hull. Said thruster portion 200 comprises said outer body 206 comprising a rounded shape being elliptical in cross-section. Said outer body 206 comprises said width 300, said height 302, and said depth 304. Said outer body 206 comprises said outer surface 306 and said inner surface 308. Said outer body 206 encloses said internal channel 314 between said leading end 320 and said trailing end 322. relative to said direction of travel 324 for said boat 102 in said water 104, said internal channel 314 comprises said leading end 320 and said trailing end 322. Said leading end 320 and said trailing end 322 are open and configured to direct the flow of water through said thruster portion 200 as said thruster assembly 100 is dragged through said water being attached to said boat 102. Said outer body 206 comprises said top surface 310 and said bottom surface 312, each being parts of said outer surface 306 and said top inner surface 316 and said lower inner surface 318 being parts of said inner surface 308. Said leading end 320 of said internal channel 314 is configured to serve as an intake for said water 104 and said trailing end 322 is configured to expel said water 104 out of said internal channel 314. Said thruster portion 200 comprises said one or more thrusting channels 204 being arranged between said leading end 320 and said trailing end 322. Said thruster portion 200 is configured to be attached to said boat 102 at said mounting angle 902 relative to said direction of travel 324 of said boat 102 to alter a wake behind said boat 102. Said one or more thrusting channels 204 comprise a plurality of channels formed by fluid directing channels within said outer body 206 extending a portion of the distance between said leading end 320 and said trailing end 322.

Said thruster assembly 100 to create shaped waves in said water 104 behind said boat 102 for water sports, such as wake surfing. Said thruster assembly 100 comprises said thruster portion 200. Said thruster assembly 100 is configured to attach to a portion of said boat 102, such as said stern portion 700, said port side 2000, said starboard side 2002, or on a bottom portion of the hull. Said thruster portion 200 comprises said outer body 206 comprising a rounded shape being elliptical in cross-section. Said outer body 206 comprises said width 300, said height 302, and said depth 304. Said outer body 206 comprises said outer surface 306 and said inner surface 308. Said outer body 206 encloses said internal channel 314 between said leading end 320 and said trailing end 322. relative to said direction of travel 324 for said boat 102 in said water 104, said internal channel 314 comprises said leading end 320 and said trailing end 322. Said leading end 320 and said trailing end 322 are open and configured to direct the flow of water through said thruster portion 200 as said thruster assembly 100 is dragged through said water being attached to said boat 102. Said outer body 206 comprises said top surface 310 and said bottom surface 312, each being parts of said outer surface 306 and said top inner surface 316 and said lower inner surface 318 being parts of said inner surface 308. Said leading end 320 of said internal channel 314 is configured to serve as an intake for said water 104 and said trailing end 322 is configured to expel said water 104 out of said internal channel 314. Said thruster portion 200 comprises said one or more thrusting channels 204 being arranged between said leading end 320 and said trailing end 322. Said thruster portion 200 is configured to be attached to said boat 102 at said mounting angle 902 relative to said direction of travel 324 of said boat 102 to alter a wake behind said boat 102. Said one or more thrusting channels 204 comprise a plurality of channels formed by fluid directing channels within said outer body 206 extending a portion of the distance between said leading end 320 and said trailing end 322. Said width 300 is greater than said height 302 of said outer body 206. Said outer body 206 comprises with a ratio of said width 300 to said height 302 being approximately one to four. Said axial mounting assembly 502 comprises said riser being 504 being substantially cylindrical, and said pushing flap 506 extending radially out from said central axis 508 of said riser being 504. Said thruster assembly 100 comprises said hinged plate 702, said hinge assembly 704, said hinge plate actuator receiver backet 706, said horizontal rotational axis 708, said vertical rotational axis 710, said horizontal rotation actuator 714. Said thruster portion 200 is pivoted about said central axis 508 by holding a portion of said riser being 504 and pressing and pulling said pushing flap 506. Said hinge plate actuator receiver backet 706 is attached to said top surface 718 forward of said hinge assembly 704. Said hinged plate 702 comprises said leading edge 720 and said trailing edge 722. Said hinged plate 702 is configured to further comprise said rotational aperture 724. Said rotational aperture 724 comprises a hole being located proximate to said trailing edge 722 and sized to rotateably hold a portion of said riser being 504 of said axial mounting assembly 502, and allow said riser being 504 to rotate about said central axis 508 and said vertical rotational axis 710. Said vertical rotation actuator 712 is configured to selectively push and pull said rod 802 between said plurality of lengths 804. Said plurality of lengths 804 comprises at least said first length 804a, said second length 804b, and said third length 804c. Said vertical actuator to thruster linkage 716 is attached between said rod 802 and said pushing flap 506. Said vertical rotation actuator 712 is configured where extending said rod 802 between said plurality of lengths 804, said vertical actuator to thruster linkage 716 is configured to rotate said pushing flap 506 about said central axis 508 through said rotary path 806. Said vertical rotation actuator 712 is configured to rotate about said rear axis 726 and said curved attachment pin 728 in order to allow said rod 802 and said central axis 508 to move about said rotary path 806 without said vertical actuator to thruster linkage 716. Said curved attachment pin 728 is configured to selectively slide into said linkage aperture 600 of said pushing flap 506.

BRIEF DESCRIPTION OF THE SEVERAL VIEWS OF THE DRAWING

FIG. 10 illustrates a perspective overview of a first rotary position 900a.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
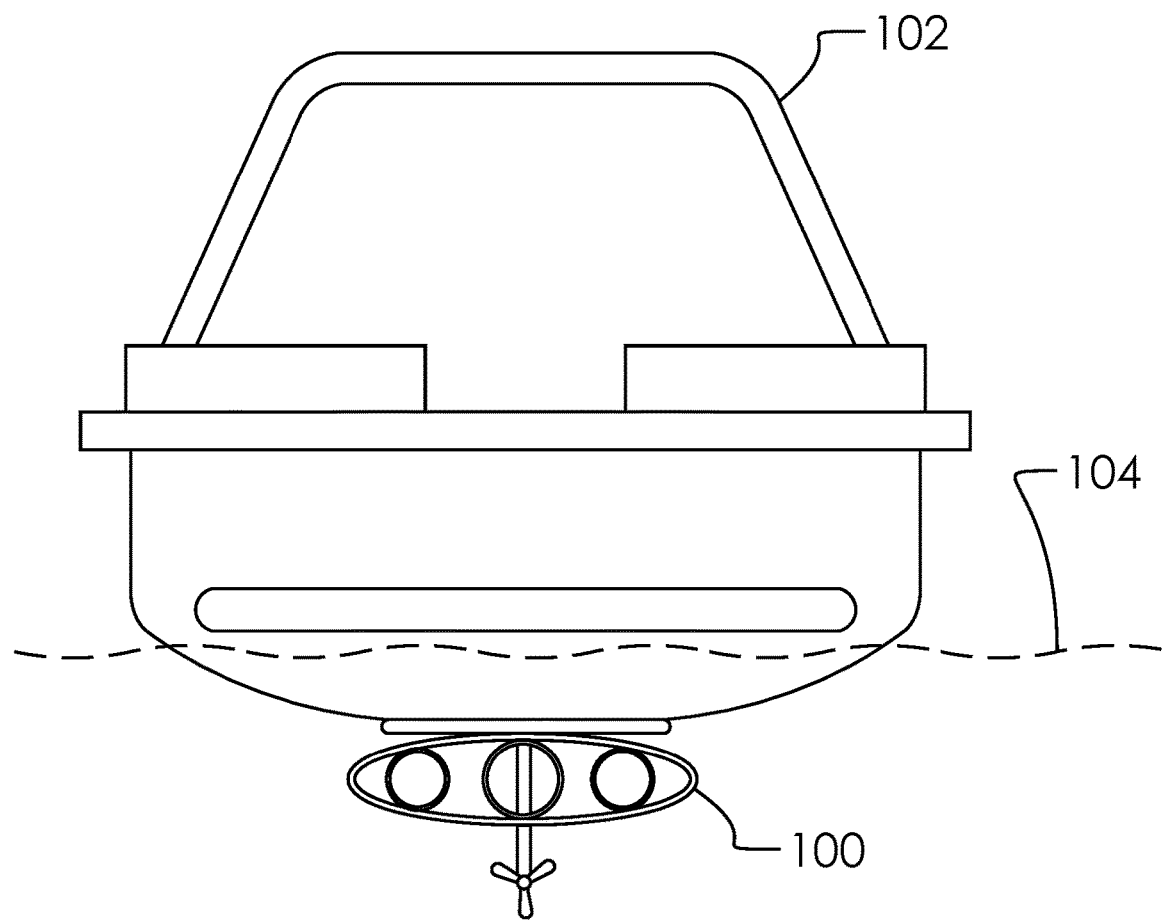
FIG. 1 illustrates an elevated rear view of a thruster assembly 100 attached to a boat 102.

FIG. 1 illustrates an elevated rear view of a thruster assembly 100 attached to a boat 102.

In one embodiment, said thruster assembly 100 can comprise a plurality of parts designed to create shaped waves in a water 104 behind said boat 102 for water sports, such as wake surfing.

Figure 2:
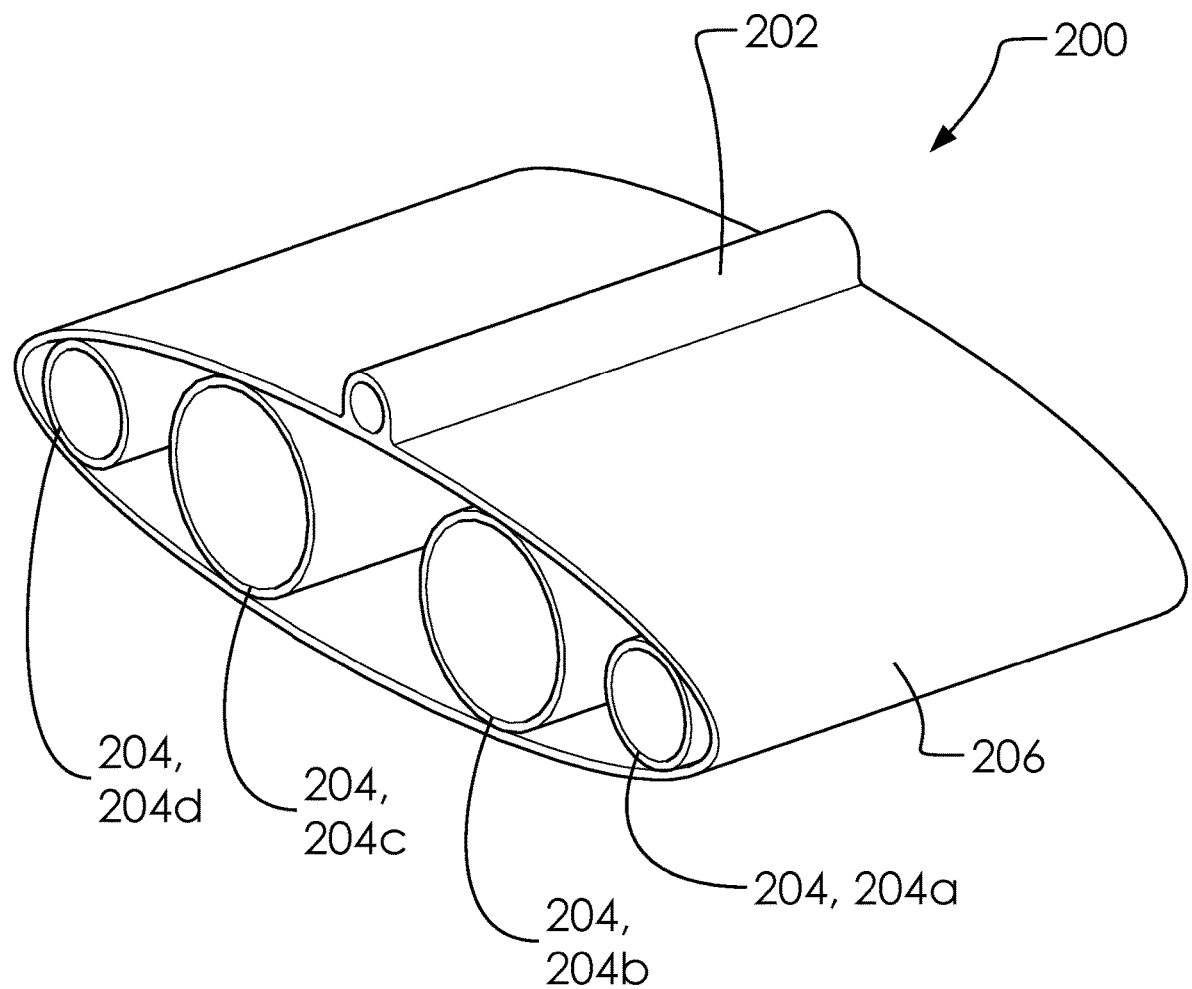
FIG. 2 illustrates a perspective overview of a thruster portion 200 of said thruster assembly 100.

FIG. 2 illustrates a perspective overview of a thruster portion 200 of said thruster assembly 100.

In one embodiment, said thruster assembly 100 can comprise an outer body 206, a mount receiver 202, and one or more thrusting channels 204 (which can comprise a first thrusting channels 204a, a second thrusting channels 204b, a third thrusting channels 204c, and a fourth thrusting channels 204d) within said outer body 206.

Figure 3A:
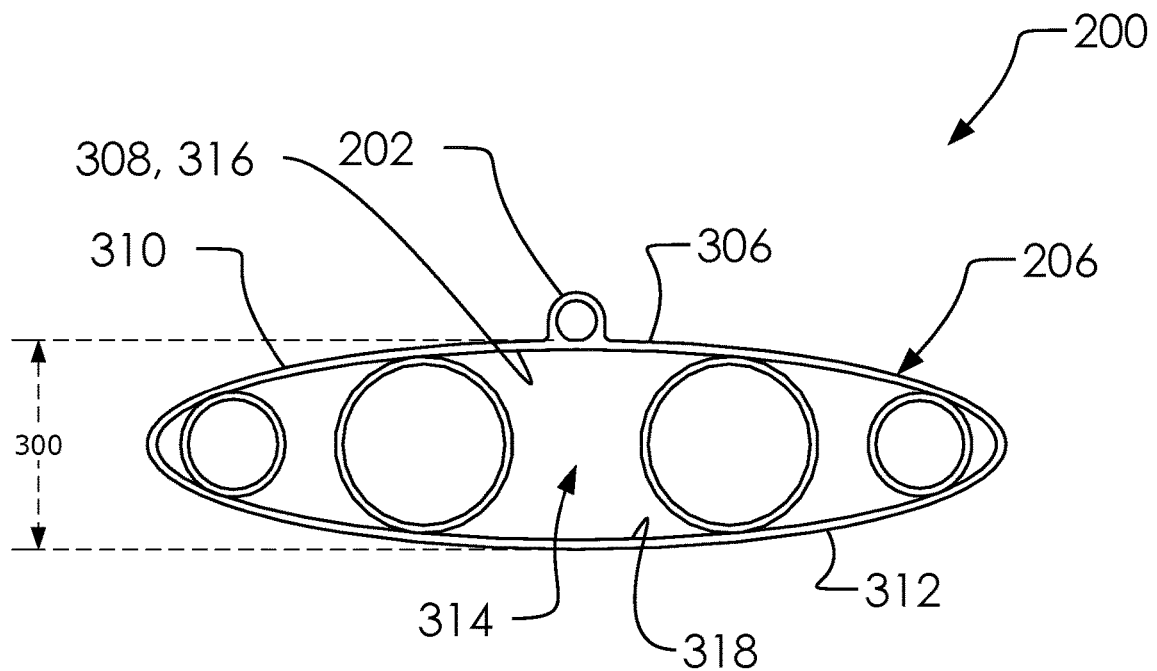
FIGS. 3A, and 3B illustrate an elevated side and top view of said thruster portion 200 of said thruster assembly 100.
Figure 3B:
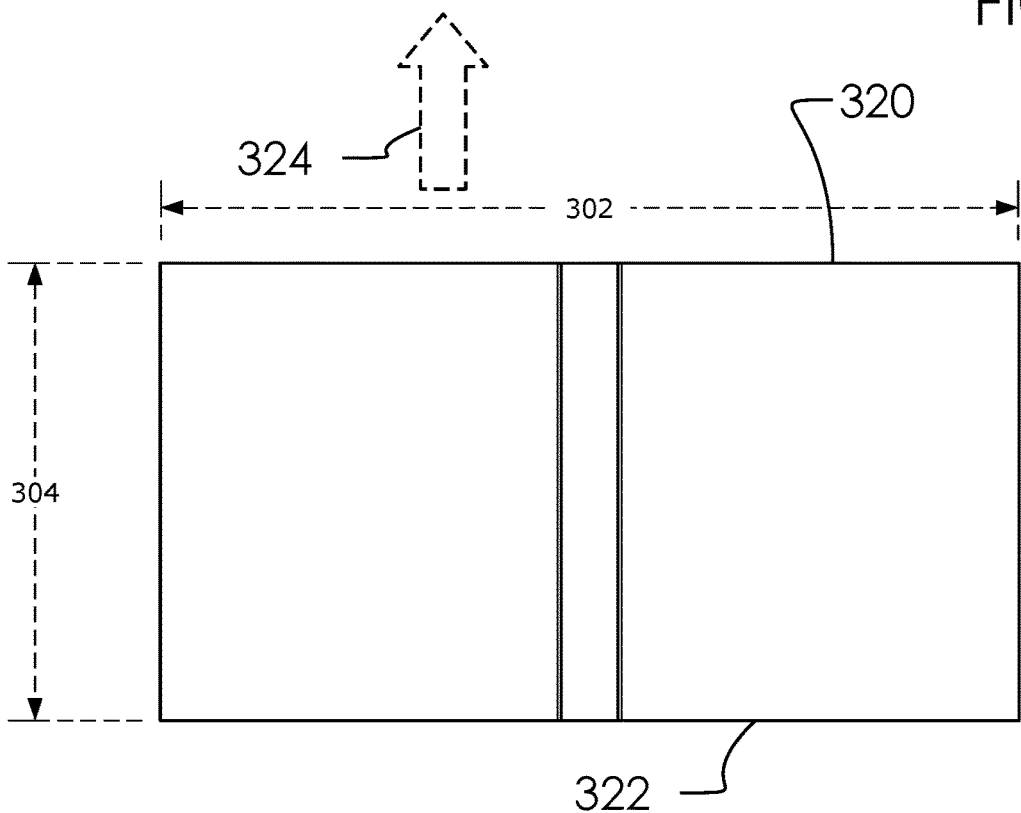

FIGS. 3A, and 3B illustrate an elevated side and top view of said thruster portion 200 of said thruster assembly 100.

In one embodiment, said thruster portion 200 can comprise a width 300, a height 302, and a depth 304. Said outer body 206 can comprise an outer surface 306 and an inner surface 308.

Said outer body 206 can comprise a round surface in the form of a circular or elliptical cross-section. As illustrated, said outer body 206 comprises an elongated elliptical cross-section being wider than tall, with a ratio of said width 300 to said height 302 being approximately one to four. In one embodiment, said width 300 can be three to four inches.

Said outer body 206 can comprise a top surface 310 and a bottom surface 312, each being parts of said outer surface 306. Said thruster portion 200 can comprise an internal channel 314 within said outer body 206. In one embodiment, said one or more thrusting channels 204 can attach to said inner surface 308 within said internal channel 314. As illustrated, each of said one or more thrusting channels 204 can attach to a top inner surface 316 and a lower inner surface 318 of said inner surface 308.

Relative to a direction of travel 324 for said boat 102 in said water 104, said internal channel 314 can comprise a leading end 320 and a trailing end 322. In one embodiment, said leading end 320 of said internal channel 314 can serve as an intake for said water 104 and said trailing end 322 can expel said water 104 out of said internal channel 314.

Said mount receiver 202 can attach to or be an integral part of said top surface 310 of said outer body 206. As illustrated, said mount receiver 202 extends between a leading end to a trailing end of said thruster portion 200.

Figure 4:
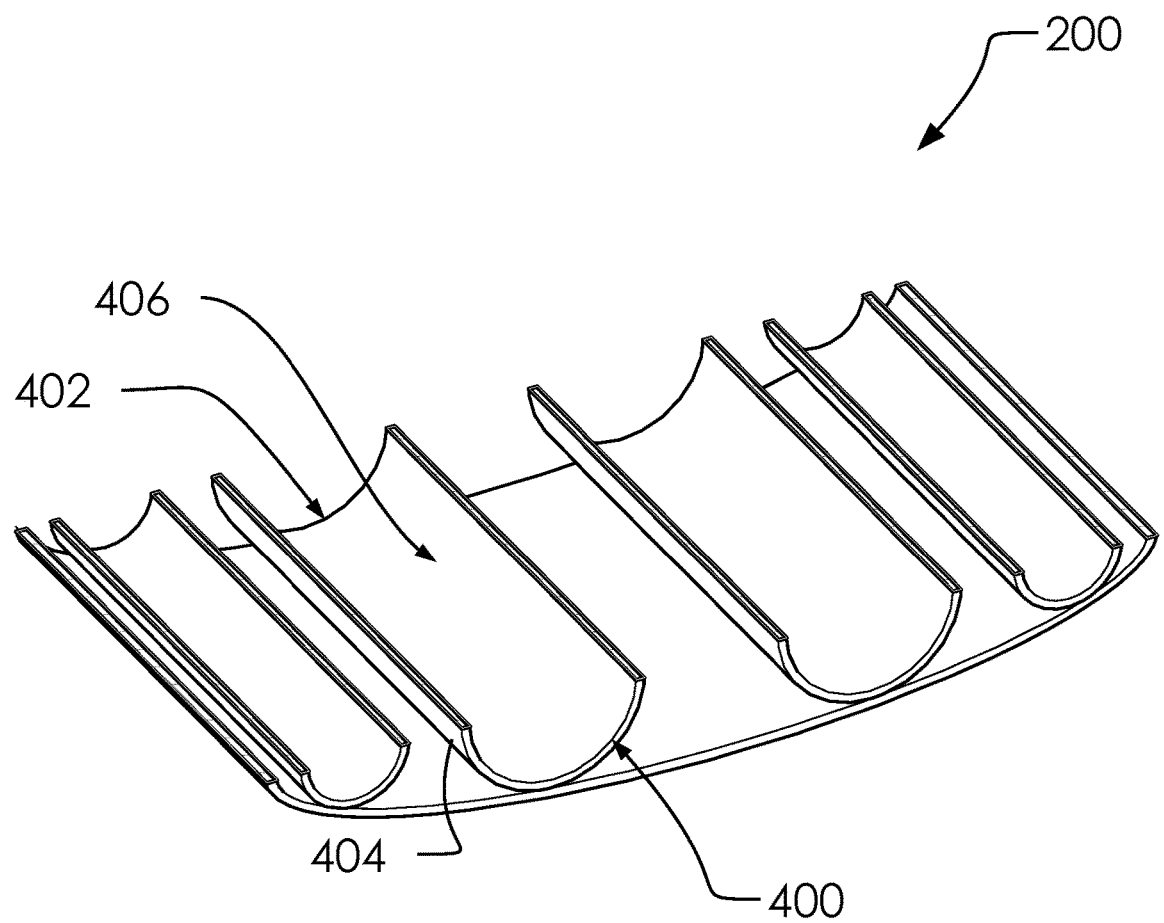
FIG. 4 illustrates a perspective cross-section overview of said thruster portion 200.

FIG. 4 illustrates a perspective cross-section overview of said thruster portion 200.

Said one or more thrusting channels 204 can each comprise a first end 400, a second end 402, a channel body 404 and a fluid channel 406 between said first end 400 and said second end 402.

Figure 5A:
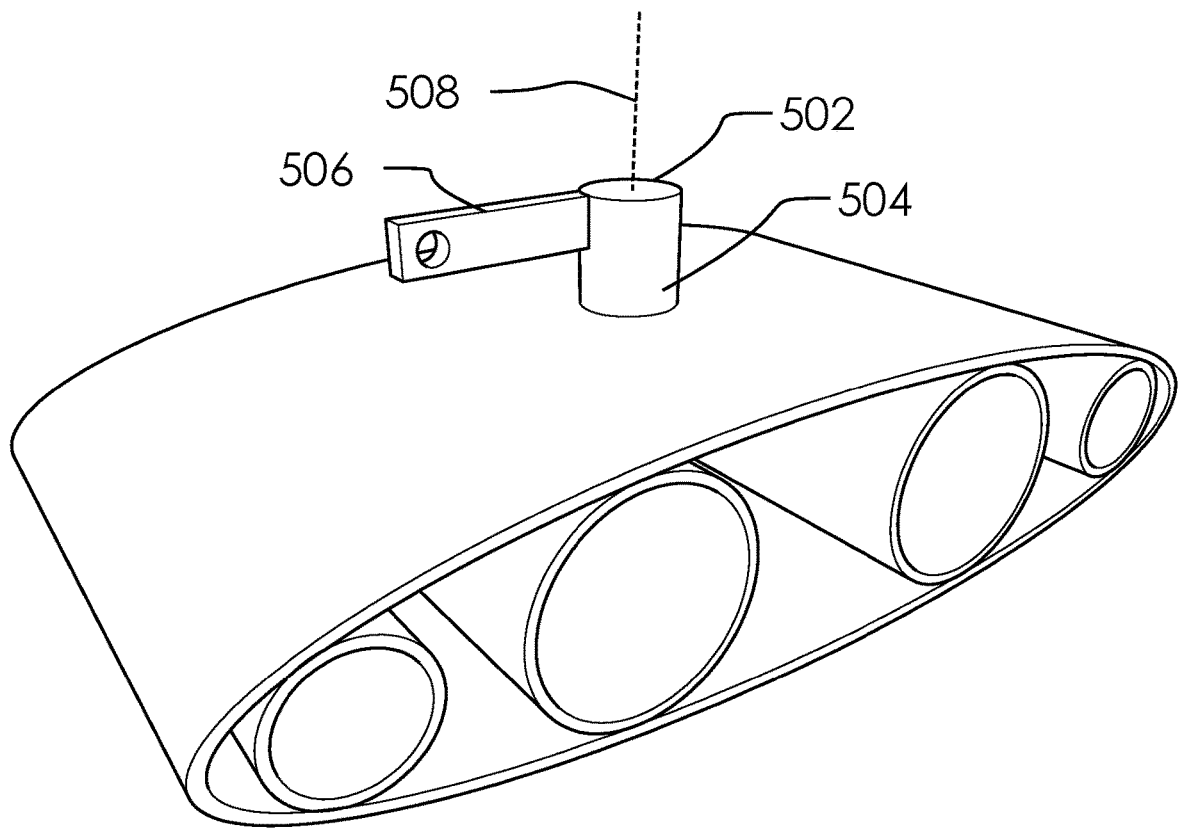
FIGS. 5A, and 5B illustrate a perspective overview of said thruster portion 200 with an axial mounting assembly 502.
Figure 5B:
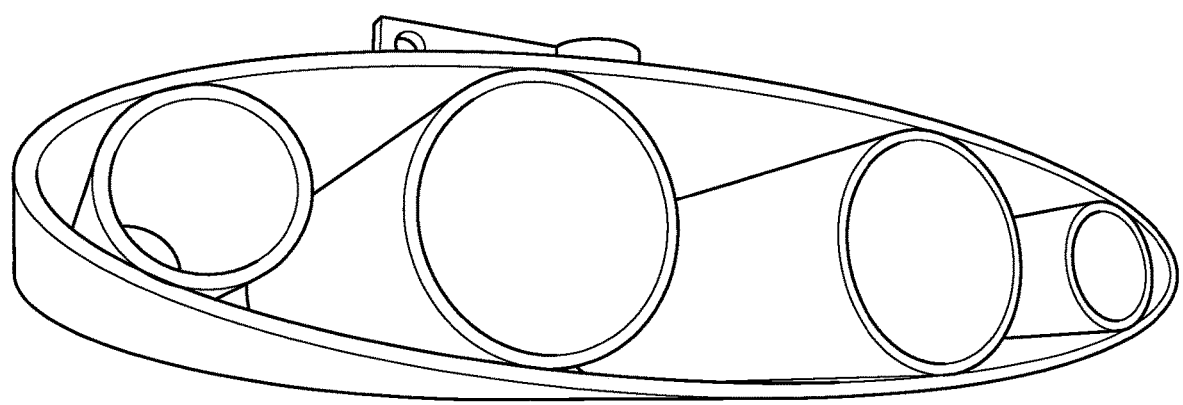

FIGS. 5A, and 5B illustrate a perspective overview of said thruster portion 200 with an axial mounting assembly 502.

Said axial mounting assembly 502 can comprise a riser being 504 being substantially cylindrical, and a pushing flap 506 extending radially out from a central axis 508 of said riser being 504. Accordingly, in one embodiment, said thruster portion 200 can be pivoted about said central axis 508 by holding a portion of said riser being 504 and pressing and pulling said pushing flap 506.

Figure 6A:
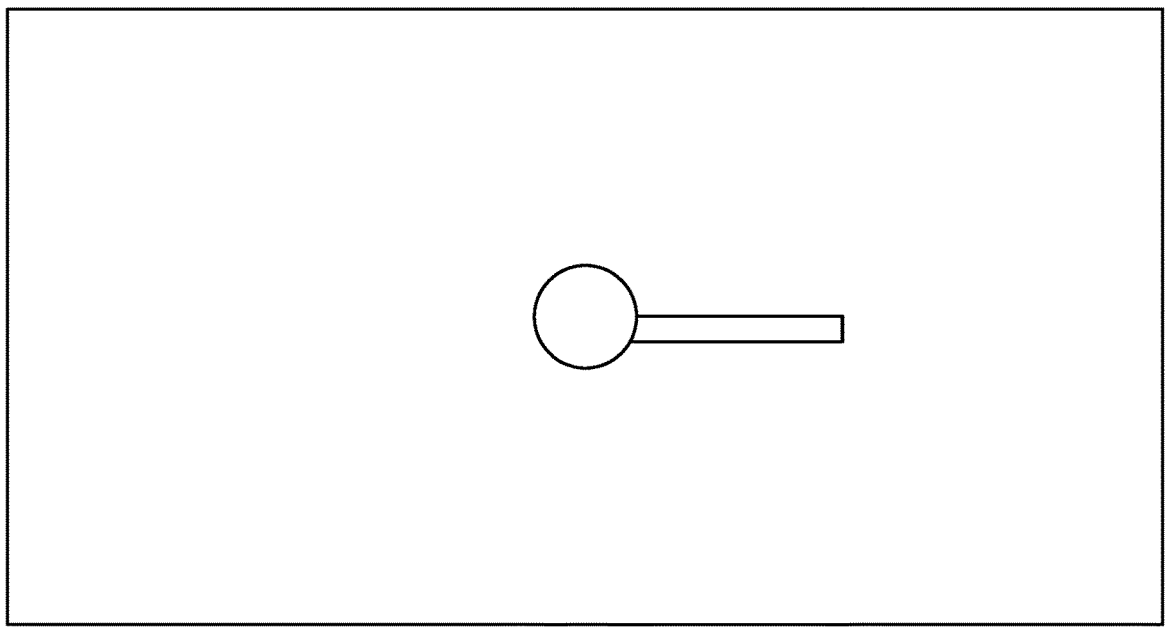
FIGS. 6A, and 6B illustrate an elevated top and front side view of said thruster portion 200 with said axial mounting assembly 502.
Figure 6B:
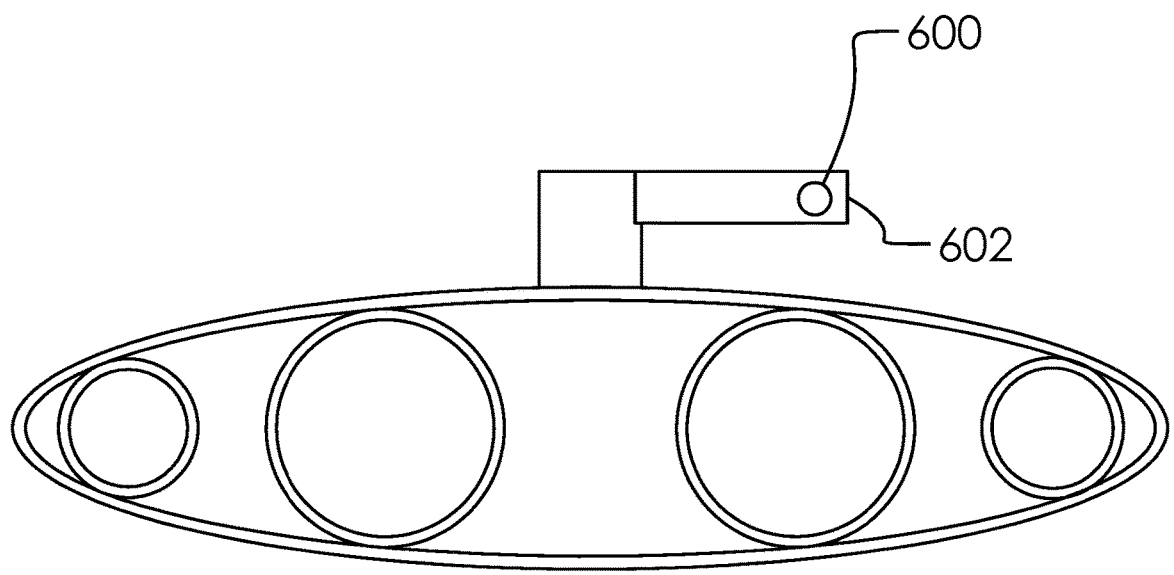

FIGS. 6A, and 6B illustrate an elevated top and front side view of said thruster portion 200 with said axial mounting assembly 502.

In one embodiment, said pushing flap 506 can comprise a linkage aperture 600 at a distal end 602 of said pushing flap 506, as illustrated.

Figure 7:
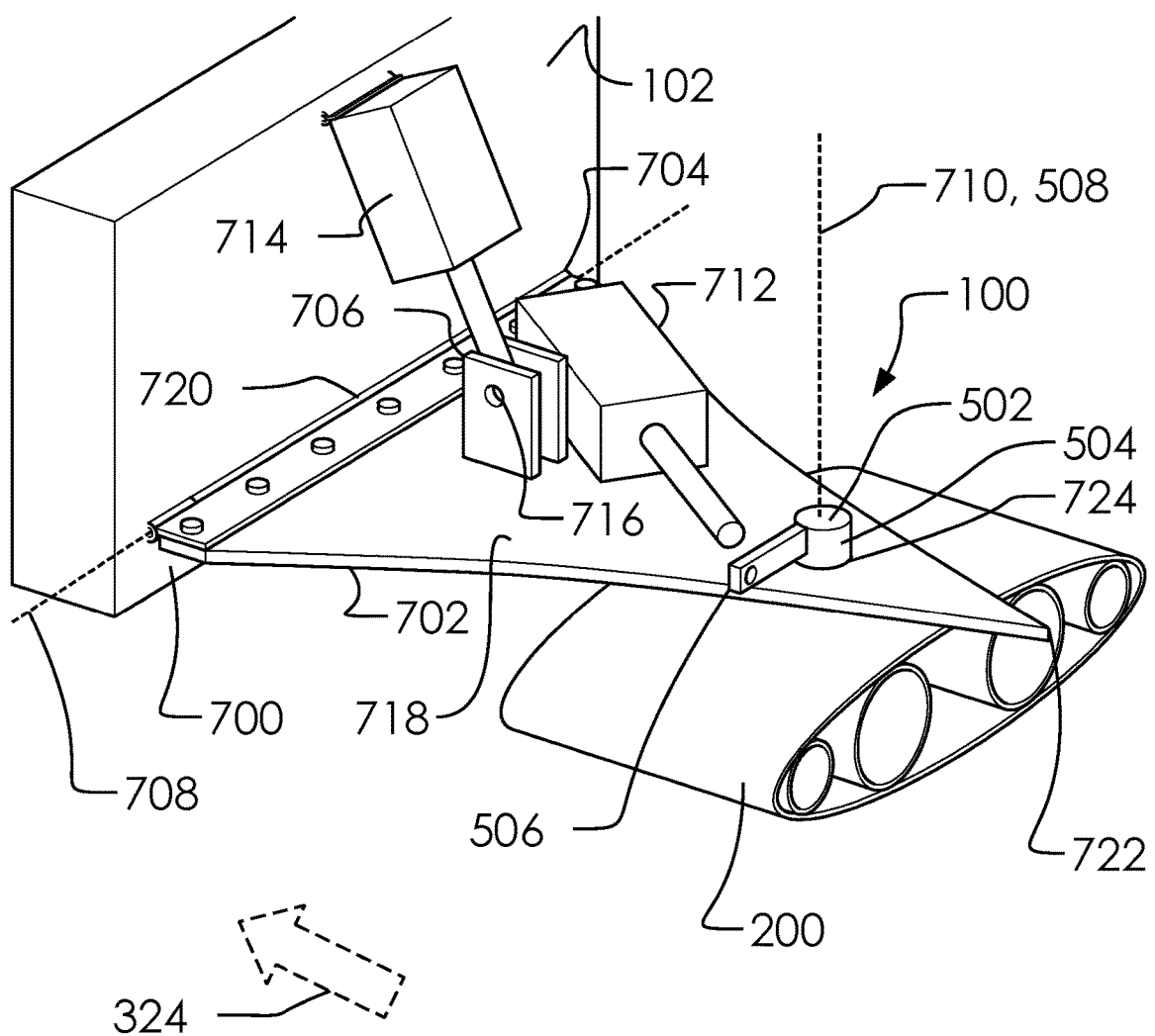
FIG. 7 illustrates a perspective overview of said thruster assembly 100 attached to a stern portion 700 of said boat 102.

FIG. 7 illustrates a perspective overview of said thruster assembly 100 attached to a stern portion 700 of said boat 102.

In one embodiment, said thruster assembly 100 can comprise a hinged plate 702, a hinge assembly 704, a hinge plate actuator receiver backet 706, a horizontal rotational axis 708, a vertical rotational axis 710, a vertical rotation actuator 712, a horizontal rotation actuator 714, and a vertical actuator to thruster linkage 716.

In one embodiment, said hinged plate 702 can be pivotably attached to a portion of said boat 102 using said hinge assembly 704; wherein, said thruster assembly 100 and said hinged plate 702 can rotate about said horizontal rotational axis 708 on said hinge assembly 704. In one embodiment, said hinge assembly 704 can allow said thruster assembly 100 to be selectively removed or inserted into said water 104.

Said vertical rotation actuator 712 can selectively push and pull portions of said thruster portion 200. In one embodiment, said vertical rotation actuator 712 can push and pull on said pushing flap 506 so as to cause said thruster portion 200 to selectively rotate about said central axis 508 and said vertical rotational axis 710. In one embodiment, said vertical rotation actuator 712 can be rotateably attached to said pushing flap 506 with said vertical actuator to thruster linkage 716, as illustrated herein and known in the art.

Said vertical rotation actuator 712 can be attached to a top surface 718 of said hinged plate 702. Likewise, said hinge plate actuator receiver backet 706 can be attached to said top surface 718 forward of said hinge assembly 704, as illustrated.

Said hinged plate 702 can comprise a leading edge 720 and a trailing edge 722. As illustrated herein, said trailing edge 722 can come to a point, but need not do so for functional purposes.

Said hinged plate 702 can further comprise a rotational aperture 724; wherein, said rotational aperture 724 can comprise a hole being located proximate to said trailing edge 722 and sized to rotateably hold a portion of said riser being 504 of said axial mounting assembly 502, and allow said riser being 504 to rotate about said central axis 508 and said vertical rotational axis 710.

Figure 8A:
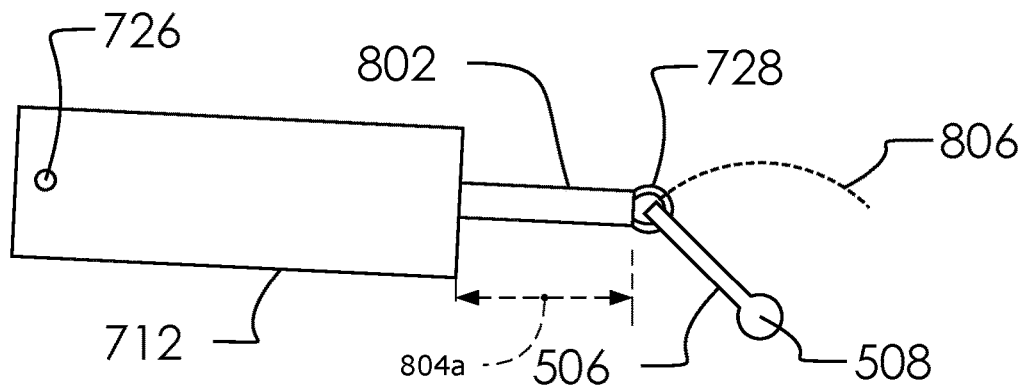
FIGS. 8A, 8B, and 8C illustrate elevated top view block diagrams of a vertical rotation actuator 712 and a pushing flap 506 in three configurations.
Figure 8B:
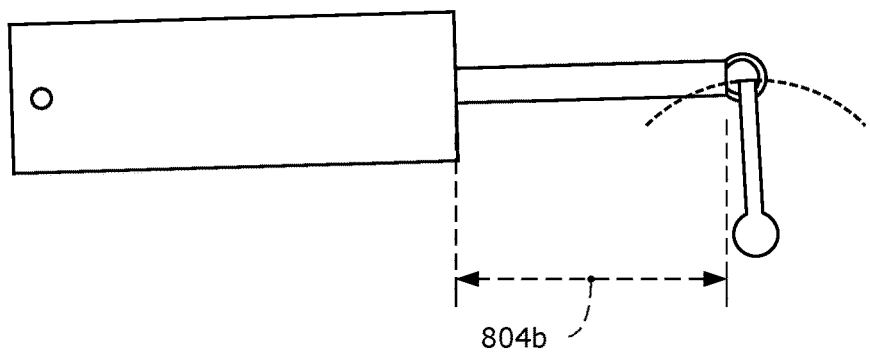
Figure 8C:
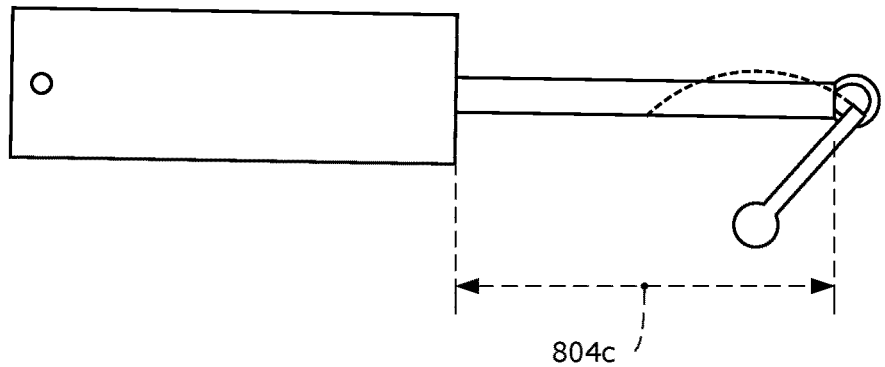

FIGS. 8A, 8B, and 8C illustrate elevated top view block diagrams of said vertical rotation actuator 712 and said pushing flap 506 in three configurations.

Said vertical rotation actuator 712 can be configured to selectively push and pull a rod 802 between a plurality of lengths 804 (which can comprise a first length 804a, a second length 804b, and a third length 804c). said vertical actuator to thruster linkage 716 can be attached between said rod 802 and said pushing flap 506. Wherein, by extending said rod 802 between said plurality of lengths 804, said vertical actuator to thruster linkage 716 can rotate said pushing flap 506 about said central axis 508 through a rotary path 806.

In one embodiment, said vertical rotation actuator 712 can rotate about a rear axis 726 and a curved attachment pin 728 in order to allow said rod 802 and said central axis 508 to move about said rotary path 806 without said vertical actuator to thruster linkage 716 (illustrated below). said curved attachment pin 728 can selectively slide into said linkage aperture 600 of said pushing flap 506.

Figure 9A:
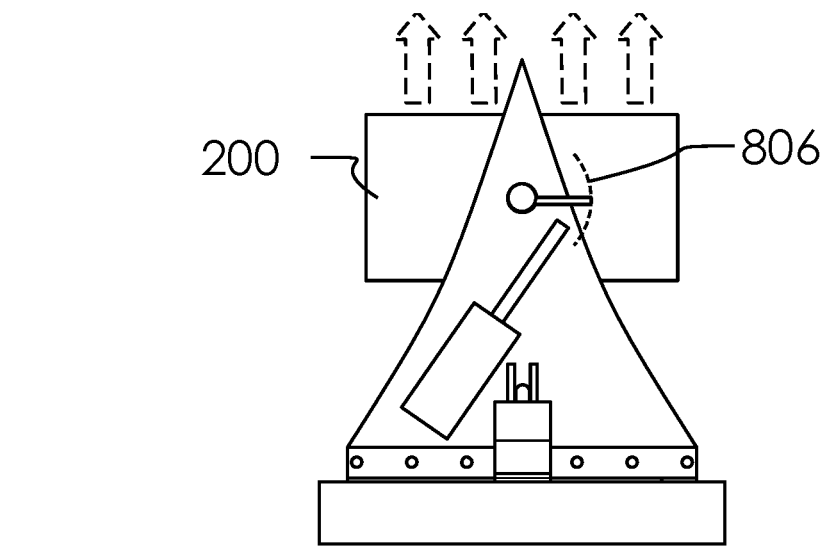
FIGS. 9A, 9B, and 9C illustrate an elevated top view of said thruster assembly 100 with said thruster portion 200 in three rotary positions 900 around a central axis 508 and along a rotary path 806.
Figure 9B:
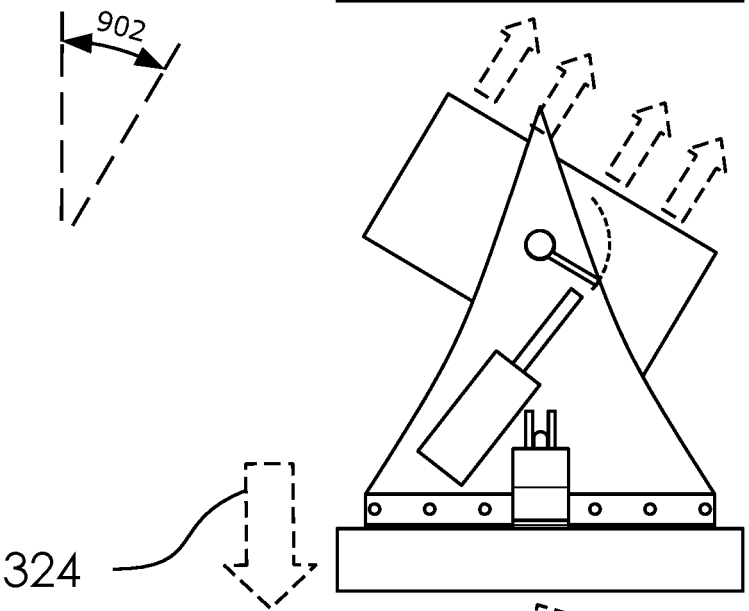
Figure 9C:
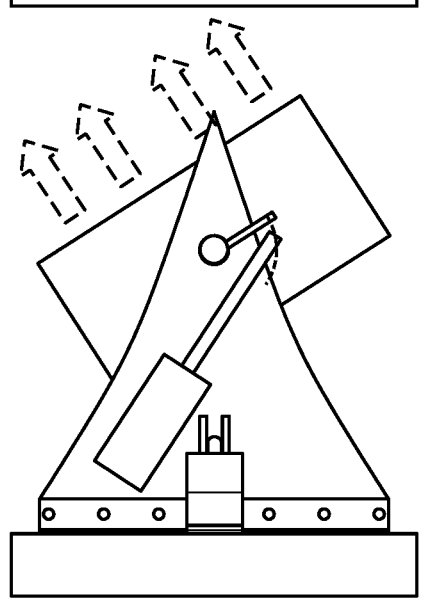

FIGS. 9A, 9B, and 9C illustrate an elevated top view of said thruster assembly 100 with said thruster portion 200 in three rotary positions 900 around said central axis 508 and along said rotary path 806.

Said three rotary positions 900 can comprise a first rotary position 900a, a second rotary position 900b, and a third rotary position 900c. Note that said vertical actuator to thruster linkage 716 are not shown in this illustration.

As said thruster portion 200 is rotated on said central axis 508 relative to said direction of travel 324, said thruster assembly 100 channels said water 104 rearward and to port or starboard for thrusting and wake creation purposes.

Figure 10:
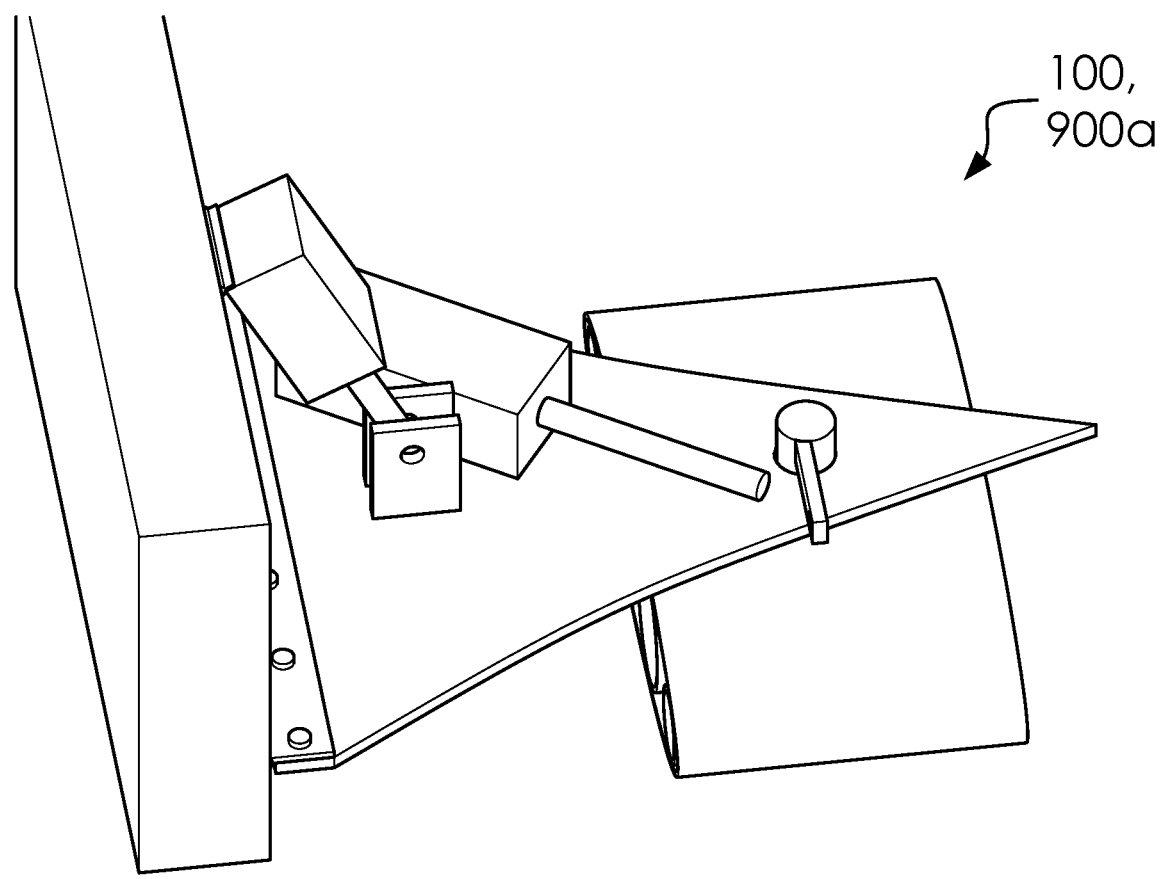

FIG. 10 illustrates a perspective overview of said first rotary position 900a.

Figure 11:
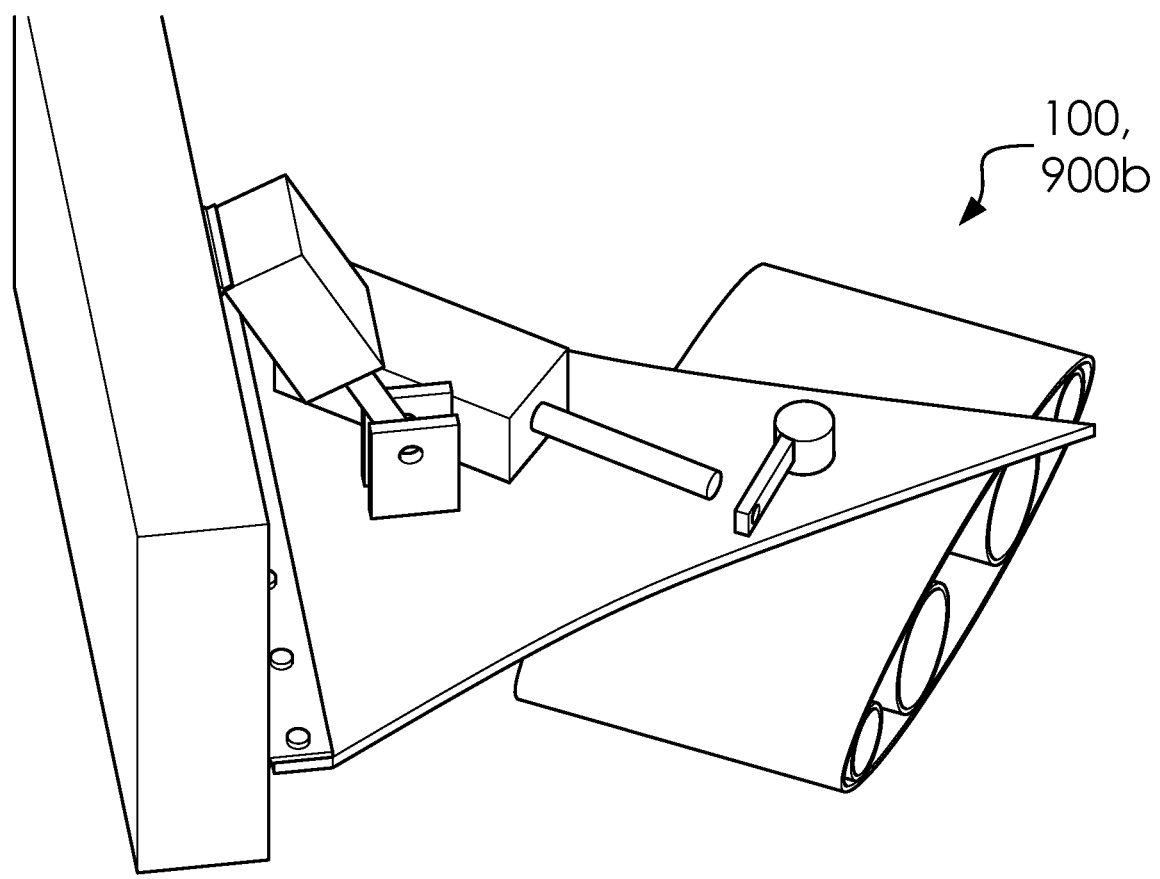
FIG. 11 illustrates a perspective overview of a second rotary position 900b.

FIG. 11 illustrates a perspective overview of said second rotary position 900b.

Figure 12:
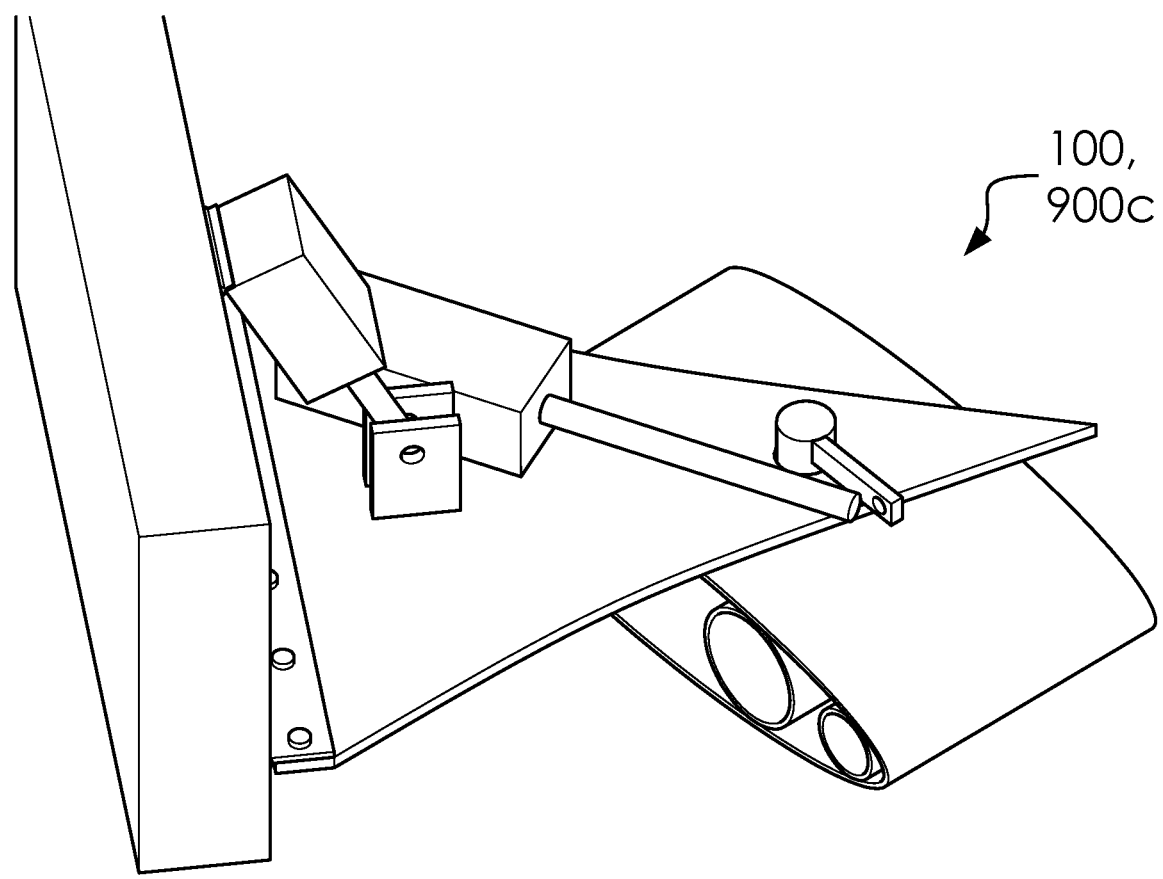
FIG. 12 illustrates a perspective overview of a third rotary position 900c.

FIG. 12 illustrates a perspective overview of said third rotary position 900c.

Figure 13A:
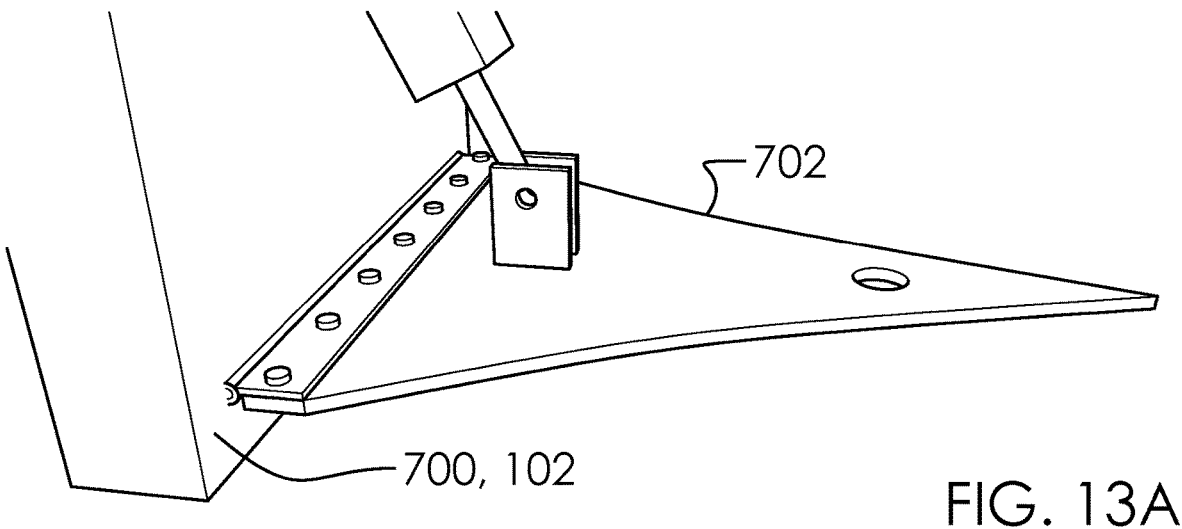
FIGS. 13A, 13B, and 13C illustrate a perspective overview, and an elevated top and side view of a hinged plate 702 with said stern portion 700 of said boat 102.
Figure 13B:
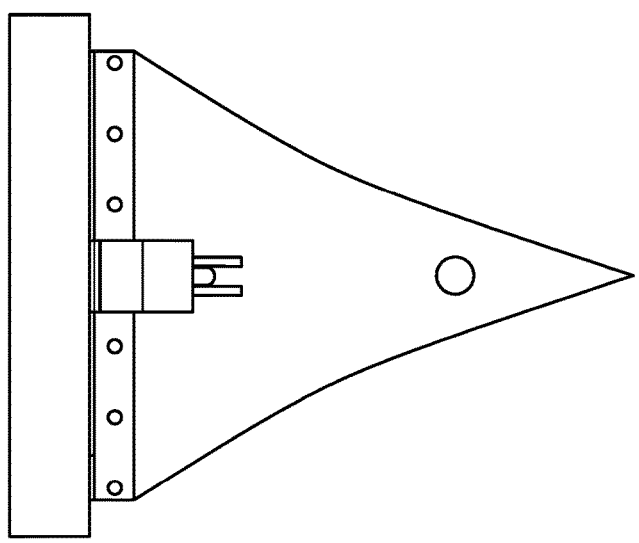
Figure 13C:
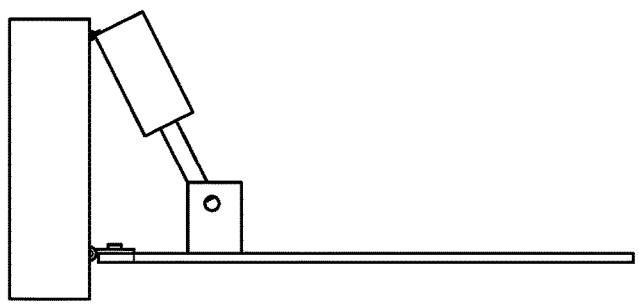

FIGS. 13A, 13B, and 13C illustrate a perspective overview, and an elevated top and side view of said hinged plate 702 with said stern portion 700 of said boat 102.

Figure 14:
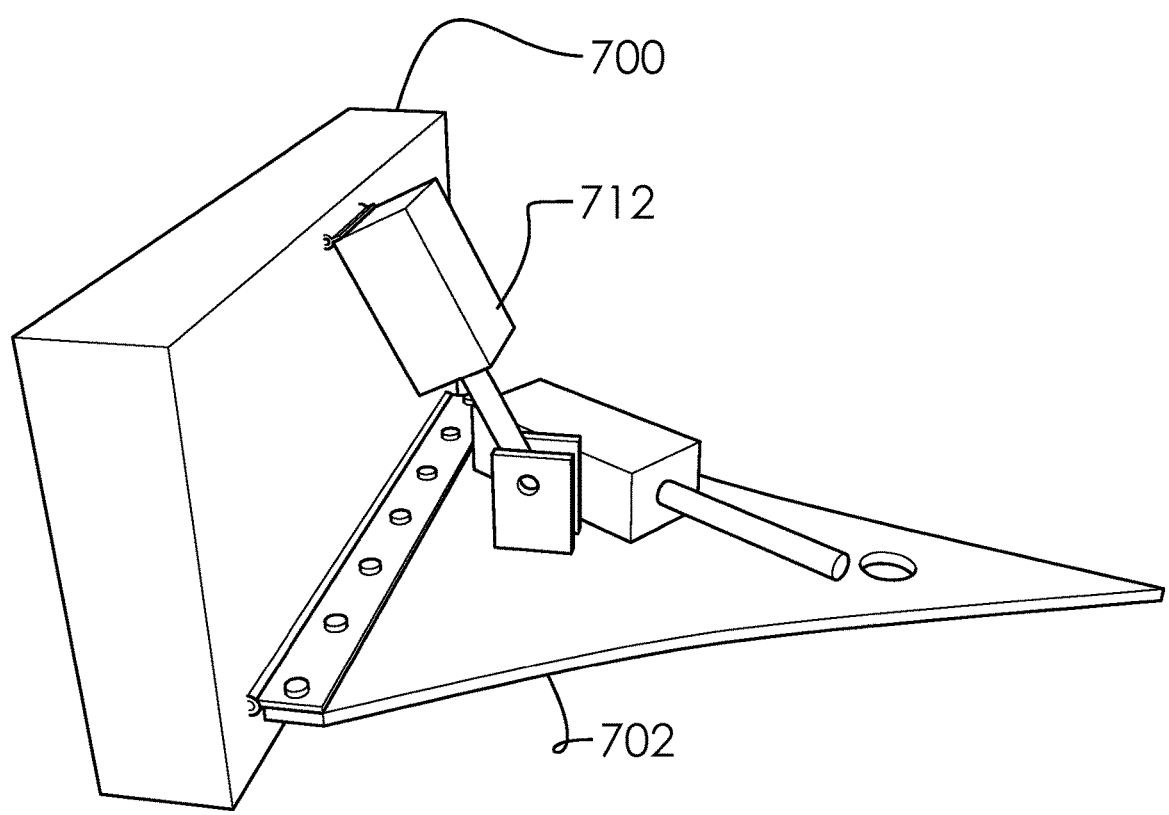
FIG. 14 illustrates a perspective overview of said hinged plate 702 with said vertical rotation actuator 712.

FIG. 14 illustrates a perspective overview of said hinged plate 702 with said vertical rotation actuator 712.

Figure 15A:
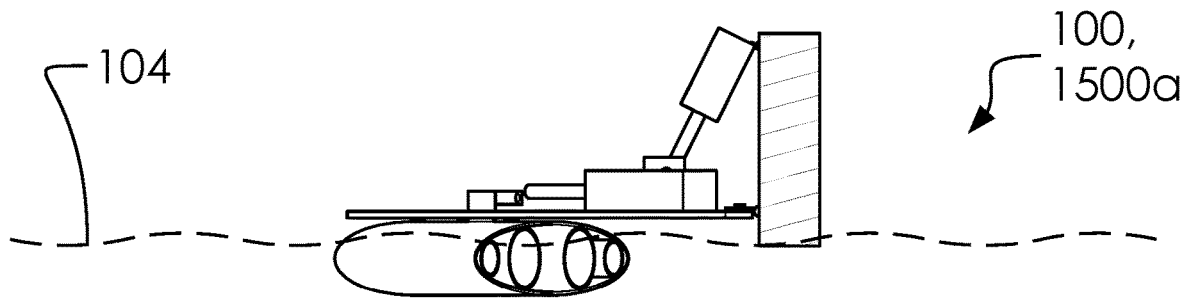
FIGS. 15A, 15B, and 15C illustrate an elevated side view of said thruster assembly 100 in one or more horizontal rotary configurations 1500; respectively comprising a first horizontal rotary configuration 1500a, a second horizontal rotary configuration 1500b, and a third horizontal rotary configuration 1500c.
Figure 15B:
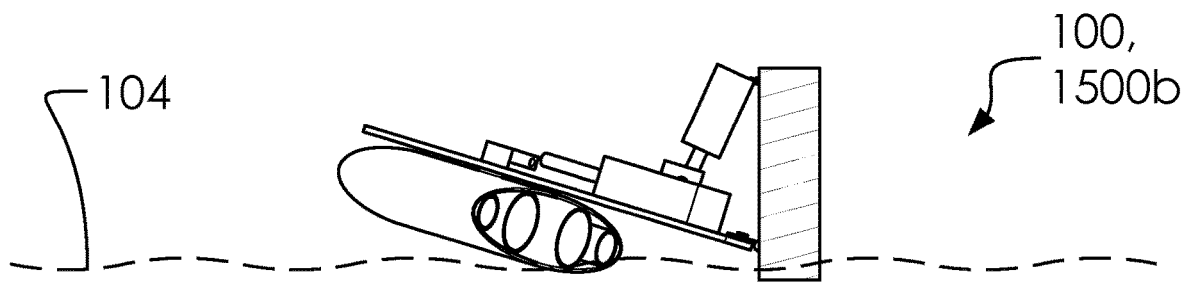
Figure 15C:
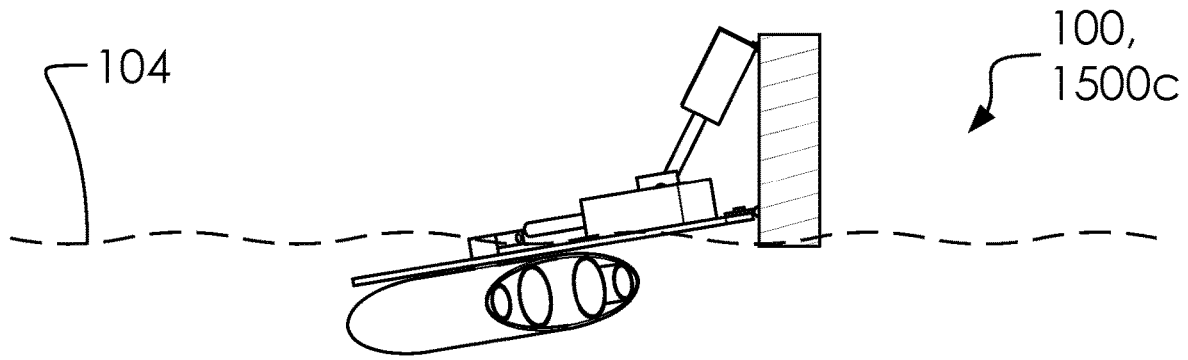

FIGS. 15A, 15B, and 15C illustrate an elevated side view of said thruster assembly 100 in one or more horizontal rotary configurations 1500; respectively comprising a first horizontal rotary configuration 1500a, a second horizontal rotary configuration 1500b, and a third horizontal rotary configuration 1500c.

In one embodiment, said thruster assembly 100 can be configured to rotate about said horizontal rotational axis 708 between said one or more horizontal rotary configurations 1500 so as to engage or disengage said thruster portion 200 with said water 104, as illustrated.

Figure 16A:
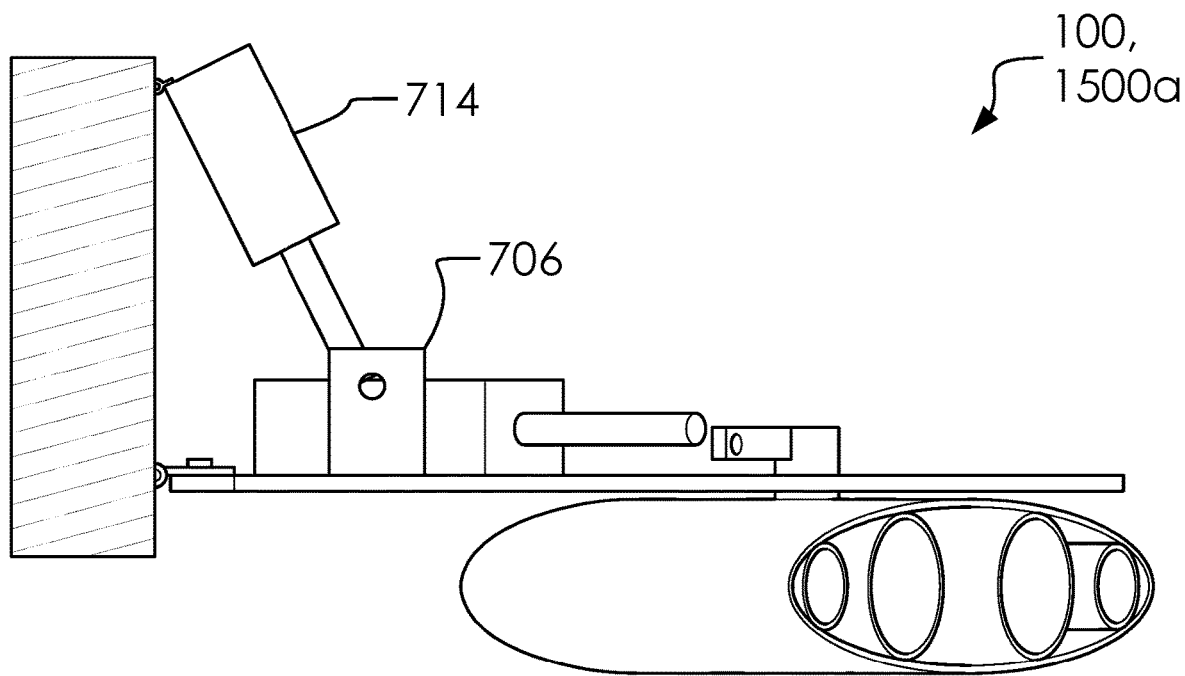
FIGS. 16A, and 16B illustrate an elevated side view of said thruster assembly 100 with a horizontal rotation actuator 714 in said first horizontal rotary configuration 1500a and said second horizontal rotary configuration 1500b.
Figure 16B:
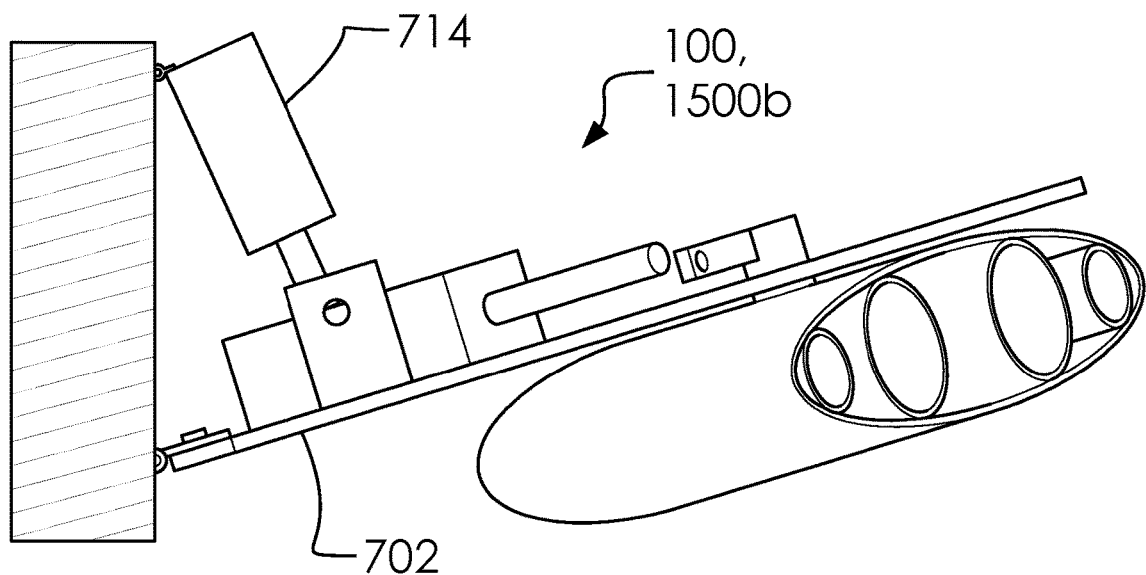

FIGS. 16A, and 16B illustrate an elevated side view of said thruster assembly 100 with said horizontal rotation actuator 714 in said first horizontal rotary configuration 1500a and said second horizontal rotary configuration 1500b.

As illustrated, said horizontal rotation actuator 714 can selectively push and pull on said hinge plate actuator receiver backet 706 so as to cause said hinged plate 702 to rotate about said hinge assembly 704 on said horizontal rotational axis 708.

Figure 17A:
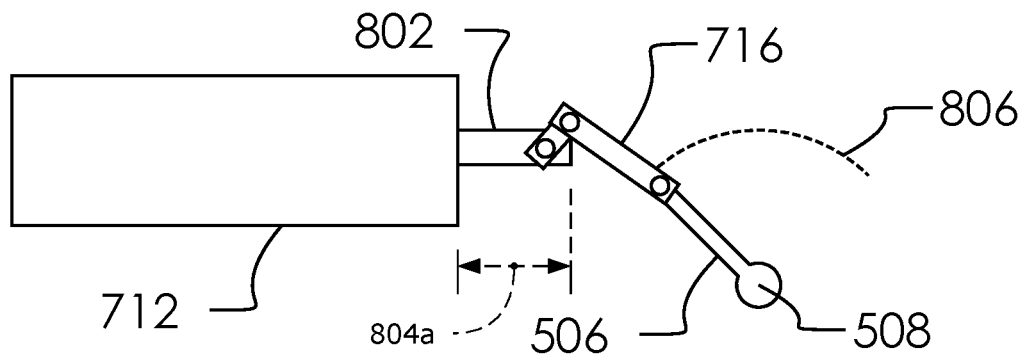
FIGS. 17A, 17B, and 17C illustrate elevated top view block diagrams of said vertical rotation actuator 712 and said pushing flap 506 in three configurations with a vertical actuator to thruster linkage 716.
Figure 17B:
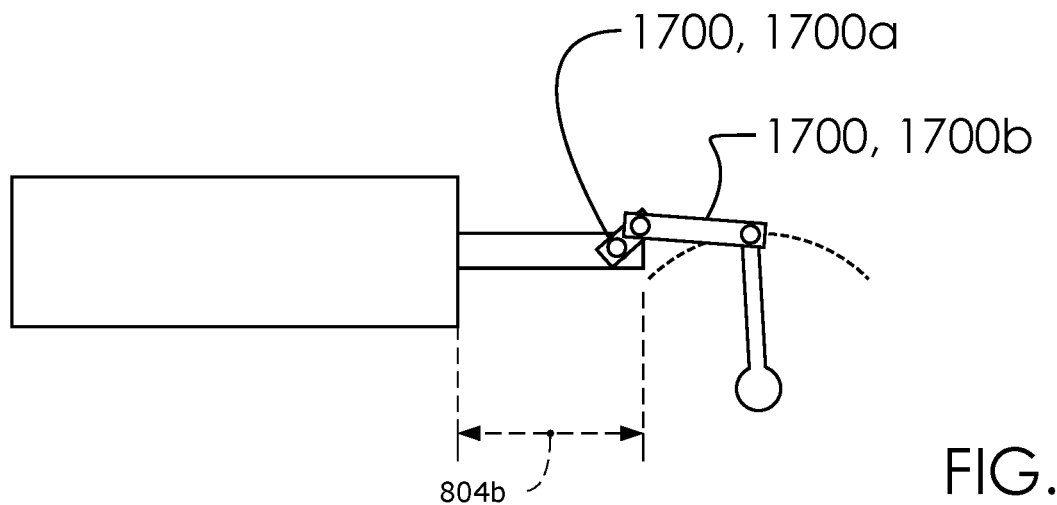
Figure 17C:
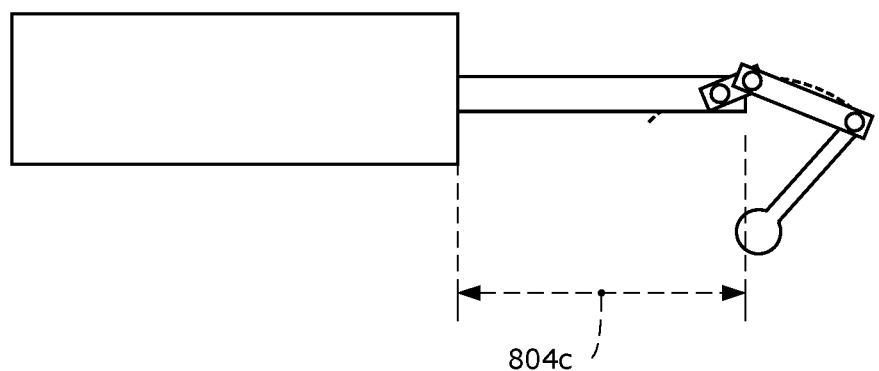

FIGS. 17A, 17B, and 17C illustrate elevated top view block diagrams of said vertical rotation actuator 712 and said pushing flap 506 in three configurations with said vertical actuator to thruster linkage 716.

As illustrated, said vertical actuator to thruster linkage 716 can comprise one or more hinged linkages 1700 (which can comprise a first hinged linkage 1700a, and a second hinged linkage 1700b).

In one embodiment, said one or more hinged linkages 1700 can be attached one to another with a first end of a first item attached to a second end of another item to create a string of rotating elements. In one embodiment, each among said one or more hinged linkages 1700 can comprise a substantially straight body with hinges at each end.

Figure 18:
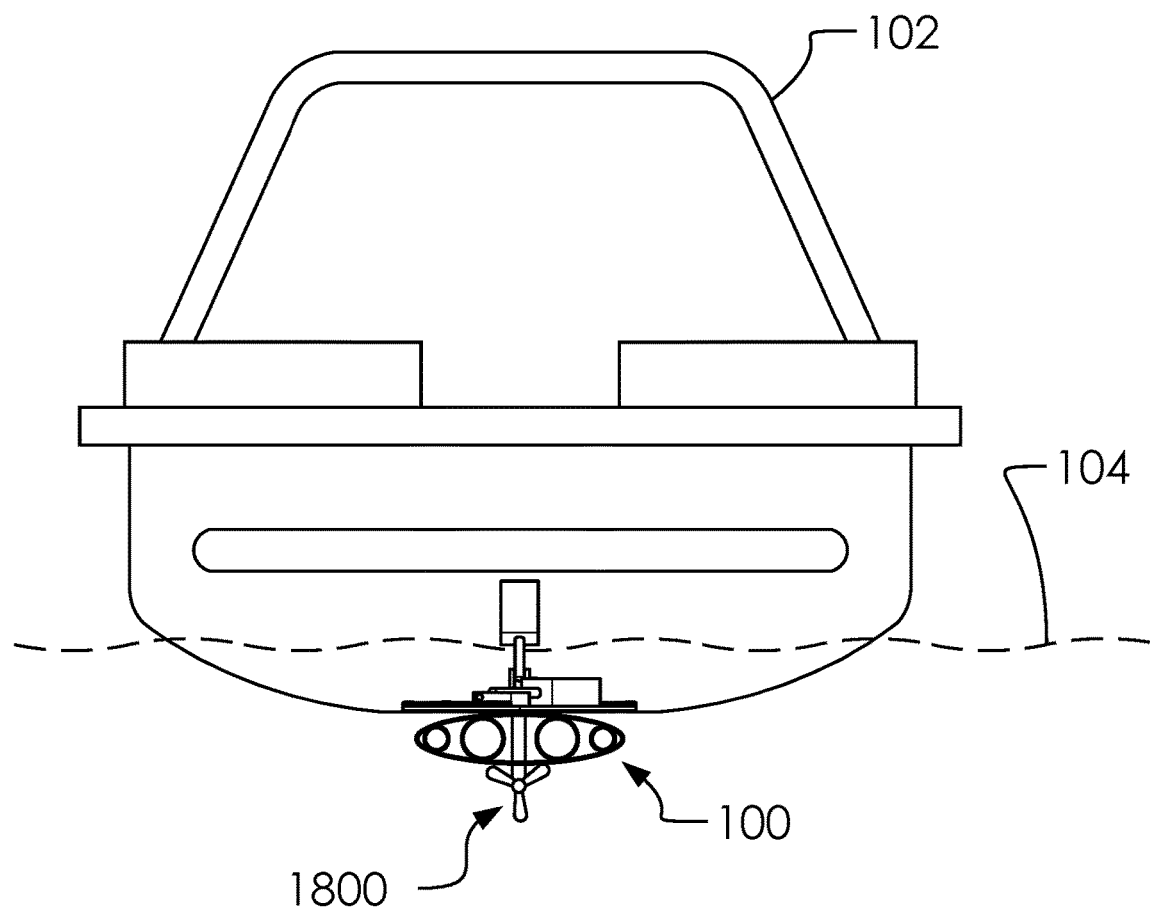
FIG. 18 illustrates an elevated rear view of said thruster assembly 100 attached to a portion of said boat 102.

FIG. 18 illustrates an elevated rear view of said thruster assembly 100 attached to a portion of said boat 102.

In one embodiment, said boat 102 can have a propeller 1800 which can be essentially aligned with said central axis 508 of said boat 102 and therefore need to extend below said thruster assembly 100, as illustrated.

Figure 19:
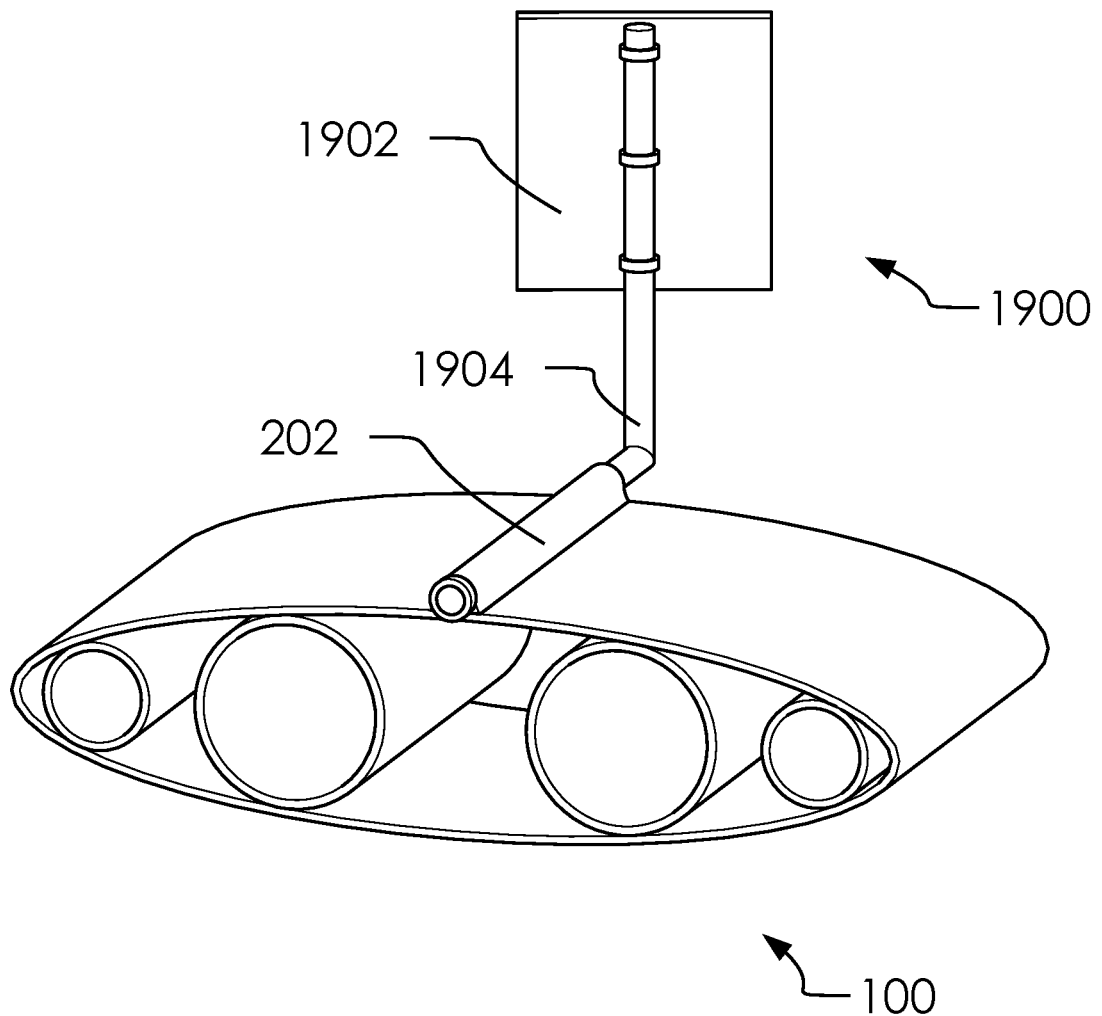
FIG. 19 illustrates a perspective overview of said thruster assembly 100 with a mount receiver 202 and a fixed thruster mounting assembly 1900.

FIG. 19 illustrates a perspective overview of said thruster assembly 100 with said mount receiver 202 and a fixed thruster mounting assembly 1900.

In one embodiment, said thruster assembly 100 can be attached to said boat 102 without use of said vertical rotation actuator 712 or said horizontal rotation actuator 714. Wherein, said thruster assembly 100 can be attached to said boat 102 at a fixed angle relative to said direction of travel 324 and said central axis 508.

In one embodiment, said fixed thruster mounting assembly 1900 can comprise a mounting bracket 1902 and a mounting arm 1904. In one embodiment, said mounting bracket 1902 can attach to a portion of said boat 102, such as said stern portion 700, port side, starboard side, or on a bottom portion of the hull. As illustrated, said mounting arm 1904 can attach to said mounting bracket 1902 at one end and said mount receiver 202 at another end.

Figure 20:
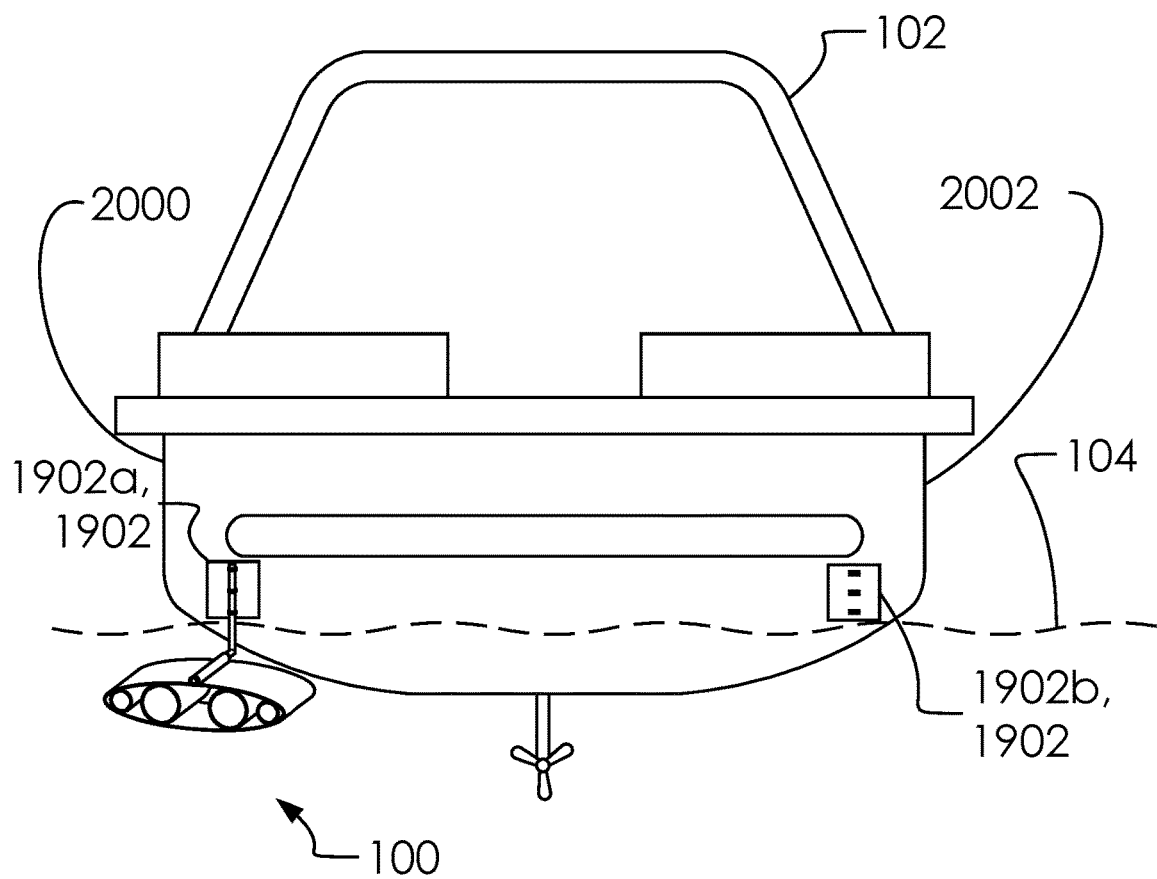
FIG. 20 illustrates elevated rear view of said boat 102 with said thruster assembly 100 attached using said fixed thruster mounting assembly 1900.

FIG. 20 illustrates elevated rear view of said boat 102 with said thruster assembly 100 attached using said fixed thruster mounting assembly 1900.

In one embodiment, said mounting bracket 1902 can comprise a first mounting bracket 1902a and a second mounting bracket 1902b. In one embodiment, said thruster assembly 100 can comprise said first mounting bracket 1902a attached proximate to a port side 2000 of said boat 102 and said second mounting bracket 1902b attached proximate to a starboard side 2002 of said boat 102. Accordingly, said thruster assembly 100 can be moved between said fixed thruster mounting assembly 1900 to create a wake on either side of said boat 102.

With reference to the claims, the following sentences are included for completeness of the disclosure.

Said thruster assembly 100 to create shaped waves in said water 104 behind said boat 102 for water sports, such as wake surfing. Said thruster assembly 100 comprises said thruster portion 200. Said thruster assembly 100 can be configured to attach to a portion of said boat 102, such as said stern portion 700, said port side 2000, said starboard side 2002, or on a bottom portion of the hull. Said thruster portion 200 comprises said outer body 206 comprising a rounded shape being elliptical in cross-section. Said outer body 206 comprises said width 300, said height 302, and said depth 304. Said outer body 206 comprises said outer surface 306 and said inner surface 308. Said outer body 206 encloses said internal channel 314 between said leading end 320 and said trailing end 322. relative to said direction of travel 324 for said boat 102 in said water 104, said internal channel 314 comprises said leading end 320 and said trailing end 322. Said leading end 320 and said trailing end 322 can be open and configured to direct the flow of water through said thruster portion 200 as said thruster assembly 100 can be dragged through said water being attached to said boat 102. Said outer body 206 comprises said top surface 310 and said bottom surface 312, each being parts of said outer surface 306 and said top inner surface 316 and said lower inner surface 318 being parts of said inner surface 308. Said leading end 320 of said internal channel 314 can be configured to serve as an intake for said water 104 and said trailing end 322 can be configured to expel said water 104 out of said internal channel 314. Said thruster portion 200 comprises said one or more thrusting channels 204 being arranged between said leading end 320 and said trailing end 322. Said thruster portion 200 can be configured to be attached to said boat 102 at a mounting angle 902 relative to said direction of travel 324 of said boat 102 to alter a wake behind said boat 102. Said one or more thrusting channels 204 comprise a plurality of channels formed by fluid directing channels within said outer body 206 extending a portion of the distance between said leading end 320 and said trailing end 322. Said width 300 can be greater than said height 302 of said outer body 206. Said outer body 206 comprises with a ratio of said width 300 to said height 302 being approximately one to four. Said axial mounting assembly 502 comprises said riser being 504 being substantially cylindrical, and said pushing flap 506 extending radially out from said central axis 508 of said riser being 504. Said thruster assembly 100 comprises said hinged plate 702, said hinge assembly 704, said hinge plate actuator receiver backet 706, said horizontal rotational axis 708, said vertical rotational axis 710, said horizontal rotation actuator 714. Said thruster portion 200 can be pivoted about said central axis 508 by holding a portion of said riser being 504 and pressing and pulling said pushing flap 506. Said hinge plate actuator receiver backet 706 can be attached to said top surface 718 forward of said hinge assembly 704. Said hinged plate 702 comprises said leading edge 720 and said trailing edge 722. Said hinged plate 702 can be configured to further comprise said rotational aperture 724. Said rotational aperture 724 comprises a hole being located proximate to said trailing edge 722 and sized to rotateably hold a portion of said riser being 504 of said axial mounting assembly 502, and allow said riser being 504 to rotate about said central axis 508 and said vertical rotational axis 710. Said vertical rotation actuator 712 can be configured to selectively push and pull said rod 802 between said plurality of lengths 804. Said plurality of lengths 804 comprises at least said first length 804a, said second length 804b, and said third length 804c. Said vertical actuator to thruster linkage 716 can be attached between said rod 802 and said pushing flap 506. Said vertical rotation actuator 712 can be configured where extending said rod 802 between said plurality of lengths 804, said vertical actuator to thruster linkage 716 can be configured to rotate said pushing flap 506 about said central axis 508 through said rotary path 806. Said vertical rotation actuator 712 can be configured to rotate about said rear axis 726 and said curved attachment pin 728 to allow said rod 802 and said central axis 508 to move about said rotary path 806 without said vertical actuator to thruster linkage 716. Said curved attachment pin 728 can be configured to selectively slide into said linkage aperture 600 of said pushing flap 506. Said thruster assembly 100 comprises said hinged plate 702, said hinge assembly 704, said hinge plate actuator receiver backet 706, said horizontal rotational axis 708, said vertical rotational axis 710, said vertical rotation actuator 712, and said vertical actuator to thruster linkage 716. Said hinged plate 702 can be pivotably attached to a portion of said boat 102 using said hinge assembly 704. Said thruster assembly 100 and said hinged plate 702 can be configured to rotate about said horizontal rotational axis 708 on said hinge assembly 704. Said hinge assembly 704 can be configured to allow said thruster assembly 100 to be selectively removed or inserted into said water 104. Said vertical rotation actuator 712 can be configured to selectively push and pull portions of said thruster portion 200. Said vertical rotation actuator 712 can be configured to push and pull on said pushing flap 506 to cause said thruster portion 200 to selectively rotate about said central axis 508 and said vertical rotational axis 710. Said vertical rotation actuator 712 can be rotateably attached to said pushing flap 506 with said vertical actuator to thruster linkage 716. Said vertical rotation actuator 712 can be attached to said top surface 718 of said hinged plate 702. Said axial mounting assembly 502 comprises said riser being 504 being substantially cylindrical, and said pushing flap 506 extending radially out from said central axis 508 of said riser being 504. Said thruster assembly 100 comprises said hinged plate 702, said hinge assembly 704, said hinge plate actuator receiver backet 706, said horizontal rotational axis 708, said vertical rotational axis 710, said horizontal rotation actuator 714. Said thruster portion 200 can be pivoted about said central axis 508 by holding a portion of said riser being 504 and pressing and pulling said pushing flap 506. Said hinge plate actuator receiver backet 706 can be attached to said top surface 718 forward of said hinge assembly 704. Said hinged plate 702 comprises said leading edge 720 and said trailing edge 722. Said hinged plate 702 can be configured to further comprise said rotational aperture 724. Said rotational aperture 724 comprises a hole being located proximate to said trailing edge 722 and sized to rotateably hold a portion of said riser being 504 of said axial mounting assembly 502, and allow said riser being 504 to rotate about said central axis 508 and said vertical rotational axis 710. Said thruster assembly 100 comprises said hinged plate 702, said hinge assembly 704, said hinge plate actuator receiver backet 706, said horizontal rotational axis 708, said vertical rotational axis 710, said vertical rotation actuator 712, and said vertical actuator to thruster linkage 716. Said hinged plate 702 can be pivotably attached to a portion of said boat 102 using said hinge assembly 704. Said thruster assembly 100 and said hinged plate 702 can be configured to rotate about said horizontal rotational axis 708 on said hinge assembly 704. Said hinge assembly 704 can be configured to allow said thruster assembly 100 to be selectively removed or inserted into said water 104. Said vertical rotation actuator 712 can be configured to selectively push and pull portions of said thruster portion 200. Said vertical rotation actuator 712 can be configured to push and pull on said pushing flap 506 to cause said thruster portion 200 to selectively rotate about said central axis 508 and said vertical rotational axis 710. Said vertical rotation actuator 712 can be rotateably attached to said pushing flap 506 with said vertical actuator to thruster linkage 716. Said vertical rotation actuator 712 can be attached to said top surface 718 of said hinged plate 702. Said thruster assembly 100 can be configured to rotate about said horizontal rotational axis 708 between said one or more horizontal rotary configurations 1500 so as to engage or disengage said thruster portion 200 with said water 104 under a portion of said boat 102. Said horizontal rotation actuator 714 can be configured to selectively push and pull on said hinge plate actuator receiver backet 706 to cause said hinged plate 702 to rotate about said hinge assembly 704 on said horizontal rotational axis 708.

Said thruster assembly 100 to create shaped waves in said water 104 behind said boat 102 for water sports, such as wake surfing. Said thruster assembly 100 comprises said thruster portion 200. Said thruster assembly 100 can be configured to attach to a portion of said boat 102, such as said stern portion 700, said port side 2000, said starboard side 2002, or on a bottom portion of the hull. Said thruster portion 200 comprises said outer body 206 comprising a rounded shape being elliptical in cross-section. Said outer body 206 comprises said width 300, said height 302, and said depth 304. Said outer body 206 comprises said outer surface 306 and said inner surface 308. Said outer body 206 encloses said internal channel 314 between said leading end 320 and said trailing end 322. relative to said direction of travel 324 for said boat 102 in said water 104, said internal channel 314 comprises said leading end 320 and said trailing end 322. Said leading end 320 and said trailing end 322 can be open and configured to direct the flow of water through said thruster portion 200 as said thruster assembly 100 can be dragged through said water being attached to said boat 102. Said outer body 206 comprises said top surface 310 and said bottom surface 312, each being parts of said outer surface 306 and said top inner surface 316 and said lower inner surface 318 being parts of said inner surface 308. Said leading end 320 of said internal channel 314 can be configured to serve as an intake for said water 104 and said trailing end 322 can be configured to expel said water 104 out of said internal channel 314. Said thruster portion 200 comprises said one or more thrusting channels 204 being arranged between said leading end 320 and said trailing end 322. Said thruster portion 200 can be configured to be attached to said boat 102 at said mounting angle 902 relative to said direction of travel 324 of said boat 102 to alter a wake behind said boat 102. Said one or more thrusting channels 204 comprise a plurality of channels formed by fluid directing channels within said outer body 206 extending a portion of the distance between said leading end 320 and said trailing end 322.

Said one or more thrusting channels 204 can be configured to each comprise said first end 400, said second end 402, said channel body 404 and said fluid channel 406 between said first end 400 and said second end 402.

Said one or more thrusting channels 204 can be configured to attach to said inner surface 308 within said internal channel 314.

Said width 300 can be greater than said height 302 of said outer body 206.

Said outer body 206 comprises with a ratio of said width 300 to said height 302 being approximately one to four.

Said axial mounting assembly 502 comprises said riser being 504 being substantially cylindrical, and said pushing flap 506 extending radially out from said central axis 508 of said riser being 504. Said thruster assembly 100 comprises said hinged plate 702, said hinge assembly 704, said hinge plate actuator receiver backet 706, said horizontal rotational axis 708, said vertical rotational axis 710, said horizontal rotation actuator 714. Said thruster portion 200 can be pivoted about said central axis 508 by holding a portion of said riser being 504 and pressing and pulling said pushing flap 506. Said hinge plate actuator receiver backet 706 can be attached to said top surface 718 forward of said hinge assembly 704. Said hinged plate 702 comprises said leading edge 720 and said trailing edge 722. Said hinged plate 702 can be configured to further comprise said rotational aperture 724. Said rotational aperture 724 comprises a hole being located proximate to said trailing edge 722 and sized to rotateably hold a portion of said riser being 504 of said axial mounting assembly 502, and allow said riser being 504 to rotate about said central axis 508 and said vertical rotational axis 710.

Said vertical rotation actuator 712 can be configured to selectively push and pull said rod 802 between said plurality of lengths 804. Said plurality of lengths 804 comprises at least said first length 804a, said second length 804b, and said third length 804c. Said vertical actuator to thruster linkage 716 can be attached between said rod 802 and said pushing flap 506. Said vertical rotation actuator 712 can be configured where extending said rod 802 between said plurality of lengths 804, said vertical actuator to thruster linkage 716 can be configured to rotate said pushing flap 506 about said central axis 508 through said rotary path 806. Said vertical rotation actuator 712 can be configured to rotate about said rear axis 726 and said curved attachment pin 728 in order to allow said rod 802 and said central axis 508 to move about said rotary path 806 without said vertical actuator to thruster linkage 716. Said curved attachment pin 728 can be configured to selectively slide into said linkage aperture 600 of said pushing flap 506.

Said thruster assembly 100 comprises said hinged plate 702, said hinge assembly 704, said hinge plate actuator receiver backet 706, said horizontal rotational axis 708, said vertical rotational axis 710, said vertical rotation actuator 712, and said vertical actuator to thruster linkage 716. Said hinged plate 702 can be pivotably attached to a portion of said boat 102 using said hinge assembly 704. Said thruster assembly 100 and said hinged plate 702 can be configured to rotate about said horizontal rotational axis 708 on said hinge assembly 704. Said hinge assembly 704 can be configured to allow said thruster assembly 100 to be selectively removed or inserted into said water 104. Said vertical rotation actuator 712 can be configured to selectively push and pull portions of said thruster portion 200. Said vertical rotation actuator 712 can be configured to push and pull on said pushing flap 506 to cause said thruster portion 200 to selectively rotate about said central axis 508 and said vertical rotational axis 710. Said vertical rotation actuator 712 can be rotateably attached to said pushing flap 506 with said vertical actuator to thruster linkage 716. Said vertical rotation actuator 712 can be attached to said top surface 718 of said hinged plate 702.

Said axial mounting assembly 502 comprises said riser being 504 being substantially cylindrical, and said pushing flap 506 extending radially out from said central axis 508 of said riser being 504. Said thruster assembly 100 comprises said hinged plate 702, said hinge assembly 704, said hinge plate actuator receiver backet 706, said horizontal rotational axis 708, said vertical rotational axis 710, said horizontal rotation actuator 714. Said thruster portion 200 can be pivoted about said central axis 508 by holding a portion of said riser being 504 and pressing and pulling said pushing flap 506. Said hinge plate actuator receiver backet 706 can be attached to said top surface 718 forward of said hinge assembly 704. Said hinged plate 702 comprises said leading edge 720 and said trailing edge 722. Said hinged plate 702 can be configured to further comprise said rotational aperture 724. Said rotational aperture 724 comprises a hole being located proximate to said trailing edge 722 and sized to rotateably hold a portion of said riser being 504 of said axial mounting assembly 502, and allow said riser being 504 to rotate about said central axis 508 and said vertical rotational axis 710. Said thruster assembly 100 comprises said hinged plate 702, said hinge assembly 704, said hinge plate actuator receiver backet 706, said horizontal rotational axis 708, said vertical rotational axis 710, said vertical rotation actuator 712, and said vertical actuator to thruster linkage 716. Said hinged plate 702 can be pivotably attached to a portion of said boat 102 using said hinge assembly 704. Said thruster assembly 100 and said hinged plate 702 can be configured to rotate about said horizontal rotational axis 708 on said hinge assembly 704. Said hinge assembly 704 can be configured to allow said thruster assembly 100 to be selectively removed or inserted into said water 104. Said vertical rotation actuator 712 can be configured to selectively push and pull portions of said thruster portion 200. Said vertical rotation actuator 712 can be configured to push and pull on said pushing flap 506 to cause said thruster portion 200 to selectively rotate about said central axis 508 and said vertical rotational axis 710. Said vertical rotation actuator 712 can be rotateably attached to said pushing flap 506 with said vertical actuator to thruster linkage 716. Said vertical rotation actuator 712 can be attached to said top surface 718 of said hinged plate 702.

Said thruster assembly 100 can be configured to rotate about said horizontal rotational axis 708 between said one or more horizontal rotary configurations 1500 so as to engage or disengage said thruster portion 200 with said water 104 under a portion of said boat 102. Said horizontal rotation actuator 714 can be configured to selectively push and pull on said hinge plate actuator receiver backet 706 to cause said hinged plate 702 to rotate about said hinge assembly 704 on said horizontal rotational axis 708.

Said thruster assembly 100 can be attached to said boat 102. Said thruster assembly 100 can be attached to said boat 102 with said mounting angle 902 comprising a fixed angle relative to said direction of travel 324 and said central axis 508. Said fixed thruster mounting assembly 1900 comprises said mounting bracket 1902 and said mounting arm 1904. Said mounting bracket 1902 can be configured to attach to a portion of said boat 102, such as said stern portion 700, said port side 2000, said starboard side 2002, or on a bottom portion of the hull. Said mounting arm 1904 can be configured to attach to said mounting bracket 1902 at one end and said mount receiver 202 at another end.

Said mounting bracket 1902 comprises said first mounting bracket 1902a and said second mounting bracket 1902b. Said thruster assembly 100 comprises said first mounting bracket 1902a attached proximate to said port side 2000 of said boat 102 and said second mounting bracket 1902b attached proximate to said starboard side 2002 of said boat 102. Said thruster assembly 100 can be moved between said fixed thruster mounting assembly 1900 to create a wake on either side of said boat 102.

Said thruster assembly 100 to create shaped waves in said water 104 behind said boat 102 for water sports, such as wake surfing. Said thruster assembly 100 comprises said thruster portion 200. Said thruster assembly 100 can be configured to attach to a portion of said boat 102, such as said stern portion 700, said port side 2000, said starboard side 2002, or on a bottom portion of the hull. Said thruster portion 200 comprises said outer body 206 comprising a rounded shape being elliptical in cross-section. Said outer body 206 comprises said width 300, said height 302, and said depth 304. Said outer body 206 comprises said outer surface 306 and said inner surface 308. Said outer body 206 encloses said internal channel 314 between said leading end 320 and said trailing end 322. relative to said direction of travel 324 for said boat 102 in said water 104, said internal channel 314 comprises said leading end 320 and said trailing end 322. Said leading end 320 and said trailing end 322 can be open and configured to direct the flow of water through said thruster portion 200 as said thruster assembly 100 can be dragged through said water being attached to said boat 102. Said outer body 206 comprises said top surface 310 and said bottom surface 312, each being parts of said outer surface 306 and said top inner surface 316 and said lower inner surface 318 being parts of said inner surface 308. Said leading end 320 of said internal channel 314 can be configured to serve as an intake for said water 104 and said trailing end 322 can be configured to expel said water 104 out of said internal channel 314. Said thruster portion 200 comprises said one or more thrusting channels 204 being arranged between said leading end 320 and said trailing end 322. Said thruster portion 200 can be configured to be attached to said boat 102 at said mounting angle 902 relative to said direction of travel 324 of said boat 102 to alter a wake behind said boat 102. Said one or more thrusting channels 204 comprise a plurality of channels formed by fluid directing channels within said outer body 206 extending a portion of the distance between said leading end 320 and said trailing end 322. Said width 300 can be greater than said height 302 of said outer body 206. Said outer body 206 comprises with a ratio of said width 300 to said height 302 being approximately one to four. Said axial mounting assembly 502 comprises said riser being 504 being substantially cylindrical, and said pushing flap 506 extending radially out from said central axis 508 of said riser being 504. Said thruster assembly 100 comprises said hinged plate 702, said hinge assembly 704, said hinge plate actuator receiver backet 706, said horizontal rotational axis 708, said vertical rotational axis 710, said horizontal rotation actuator 714. Said thruster portion 200 can be pivoted about said central axis 508 by holding a portion of said riser being 504 and pressing and pulling said pushing flap 506. Said hinge plate actuator receiver backet 706 can be attached to said top surface 718 forward of said hinge assembly 704. Said hinged plate 702 comprises said leading edge 720 and said trailing edge 722. Said hinged plate 702 can be configured to further comprise said rotational aperture 724. Said rotational aperture 724 comprises a hole being located proximate to said trailing edge 722 and sized to rotateably hold a portion of said riser being 504 of said axial mounting assembly 502, and allow said riser being 504 to rotate about said central axis 508 and said vertical rotational axis 710. Said vertical rotation actuator 712 can be configured to selectively push and pull said rod 802 between said plurality of lengths 804. Said plurality of lengths 804 comprises at least said first length 804a, said second length 804b, and said third length 804c. Said vertical actuator to thruster linkage 716 can be attached between said rod 802 and said pushing flap 506. Said vertical rotation actuator 712 can be configured where extending said rod 802 between said plurality of lengths 804, said vertical actuator to thruster linkage 716 can be configured to rotate said pushing flap 506 about said central axis 508 through said rotary path 806. Said vertical rotation actuator 712 can be configured to rotate about said rear axis 726 and said curved attachment pin 728 in order to allow said rod 802 and said central axis 508 to move about said rotary path 806 without said vertical actuator to thruster linkage 716. Said curved attachment pin 728 can be configured to selectively slide into said linkage aperture 600 of said pushing flap 506.

Said thruster assembly 100 comprises said hinged plate 702, said hinge assembly 704, said hinge plate actuator receiver backet 706, said horizontal rotational axis 708, said vertical rotational axis 710, said vertical rotation actuator 712, and said vertical actuator to thruster linkage 716. Said hinged plate 702 can be pivotably attached to a portion of said boat 102 using said hinge assembly 704. Said thruster assembly 100 and said hinged plate 702 can be configured to rotate about said horizontal rotational axis 708 on said hinge assembly 704. Said hinge assembly 704 can be configured to allow said thruster assembly 100 to be selectively removed or inserted into said water 104. Said vertical rotation actuator 712 can be configured to selectively push and pull portions of said thruster portion 200. Said vertical rotation actuator 712 can be configured to push and pull on said pushing flap 506 to cause said thruster portion 200 to selectively rotate about said central axis 508 and said vertical rotational axis 710. Said vertical rotation actuator 712 can be rotateably attached to said pushing flap 506 with said vertical actuator to thruster linkage 716. Said vertical rotation actuator 712 can be attached to said top surface 718 of said hinged plate 702.

Said axial mounting assembly 502 comprises said riser being 504 being substantially cylindrical, and said pushing flap 506 extending radially out from said central axis 508 of said riser being 504. Said thruster assembly 100 comprises said hinged plate 702, said hinge assembly 704, said hinge plate actuator receiver backet 706, said horizontal rotational axis 708, said vertical rotational axis 710, said horizontal rotation actuator 714. Said thruster portion 200 can be pivoted about said central axis 508 by holding a portion of said riser being 504 and pressing and pulling said pushing flap 506. Said hinge plate actuator receiver backet 706 can be attached to said top surface 718 forward of said hinge assembly 704. Said hinged plate 702 comprises said leading edge 720 and said trailing edge 722. Said hinged plate 702 can be configured to further comprise said rotational aperture 724. Said rotational aperture 724 comprises a hole being located proximate to said trailing edge 722 and sized to rotateably hold a portion of said riser being 504 of said axial mounting assembly 502, and allow said riser being 504 to rotate about said central axis 508 and said vertical rotational axis 710. Said thruster assembly 100 comprises said hinged plate 702, said hinge assembly 704, said hinge plate actuator receiver backet 706, said horizontal rotational axis 708, said vertical rotational axis 710, said vertical rotation actuator 712, and said vertical actuator to thruster linkage 716. Said hinged plate 702 can be pivotably attached to a portion of said boat 102 using said hinge assembly 704. Said thruster assembly 100 and said hinged plate 702 can be configured to rotate about said horizontal rotational axis 708 on said hinge assembly 704. Said hinge assembly 704 can be configured to allow said thruster assembly 100 to be selectively removed or inserted into said water 104. Said vertical rotation actuator 712 can be configured to selectively push and pull portions of said thruster portion 200. Said vertical rotation actuator 712 can be configured to push and pull on said pushing flap 506 to cause said thruster portion 200 to selectively rotate about said central axis 508 and said vertical rotational axis 710. Said vertical rotation actuator 712 can be rotateably attached to said pushing flap 506 with said vertical actuator to thruster linkage 716. Said vertical rotation actuator 712 can be attached to said top surface 718 of said hinged plate 702.

Said thruster assembly 100 can be configured to rotate about said horizontal rotational axis 708 between said one or more horizontal rotary configurations 1500 so as to engage or disengage said thruster portion 200 with said water 104 under a portion of said boat 102. Said horizontal rotation actuator 714 can be configured to selectively push and pull on said hinge plate actuator receiver backet 706 to cause said hinged plate 702 to rotate about said hinge assembly 704 on said horizontal rotational axis 708.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A thruster assembly to create shaped waves in a water behind a boat for water sports; wherein,
    said thruster assembly comprises a thruster portion;
    said thruster assembly is configured to attach to a portion of said boat;
    said thruster portion comprises an outer body comprising a rounded shape being elliptical in cross-section;
    said outer body comprises a width, a height, and a depth;
    said outer body comprises an outer surface and an inner surface;
    said outer body encloses an internal channel between a leading end and a trailing end;
    relative to a direction of travel for said boat in said water, said internal channel comprises said leading end and said trailing end;
    said leading end and said trailing end are open and configured to direct the flow of water through said thruster portion as said thruster assembly is dragged through said water being attached to said boat;
    said outer body comprises a top surface and a bottom surface, each being parts of said outer surface and a top inner surface and a lower inner surface being parts of said inner surface;
    said leading end of said internal channel is configured to serve as an intake for said water and said trailing end is configured to expel said water out of said internal channel;
    said thruster portion comprises one or more thrusting channels being arranged between said leading end and said trailing end;
    said thruster portion is configured to be attached to said boat at a mounting angle relative to said direction of travel of said boat to alter a wake behind said boat;
    said one or more thrusting channels comprise a plurality of channels formed by fluid directing channels within said outer body extending a portion of the distance between said leading end and said trailing end;
    said width is greater than said height of said outer body;
    said outer body comprises with a ratio of said width to said height being approximately one to four;
    an axial mounting assembly comprises a riser being being substantially cylindrical, and a pushing flap extending radially out from a central axis of said riser being;
    said thruster assembly comprises a hinged plate, a hinge assembly, a hinge plate actuator receiver backet, a horizontal rotational axis, a vertical rotational axis, a horizontal rotation actuator;
    said thruster portion is pivoted about said central axis by holding a portion of said riser being and pressing and pulling said pushing flap;
    said hinge plate actuator receiver backet is attached to a top surface forward of said hinge assembly;
    said hinged plate comprises a leading edge and a trailing edge;
    said hinged plate is configured to further comprise a rotational aperture;
    said rotational aperture comprises a hole being located proximate to said trailing edge and sized to rotateably hold a portion of said riser being of said axial mounting assembly, and allow said riser being to rotate about said central axis and said vertical rotational axis;
    a vertical rotation actuator is configured to selectively push and pull a rod between a plurality of lengths;
    said plurality of lengths comprises at least a first length, a second length, and a third length;
    a vertical actuator to thruster linkage is attached between said rod and said pushing flap;
    said vertical rotation actuator is configured where extending said rod between said plurality of lengths, said vertical actuator to thruster linkage is configured to rotate said pushing flap about said central axis through a rotary path;
    said vertical rotation actuator is configured to rotate about a rear axis and a curved attachment pin to allow said rod and said central axis to move about said rotary path without said vertical actuator to thruster linkage;
    said curved attachment pin is configured to selectively slide into a linkage aperture of said pushing flap;
    said thruster assembly comprises said hinged plate, said hinge assembly, said hinge plate actuator receiver backet, said horizontal rotational axis, said vertical rotational axis, said vertical rotation actuator, and said vertical actuator to thruster linkage;
    said hinged plate is pivotably attached to a portion of said boat using said hinge assembly;
    said thruster assembly and said hinged plate are configured to rotate about said horizontal rotational axis on said hinge assembly;
    said hinge assembly is configured to allow said thruster assembly to be selectively removed or inserted into said water;
    said vertical rotation actuator is configured to selectively push and pull portions of said thruster portion;
    said vertical rotation actuator is configured to push and pull on said pushing flap to cause said thruster portion to selectively rotate about said central axis and said vertical rotational axis;
    said vertical rotation actuator is rotateably attached to said pushing flap with said vertical actuator to thruster linkage;
    said vertical rotation actuator is attached to said top surface of said hinged plate;
    said axial mounting assembly comprises said riser being substantially cylindrical, and said pushing flap extending radially out from said central axis of said riser being;
    said thruster assembly comprises said hinged plate, said hinge assembly, said hinge plate actuator receiver backet, said horizontal rotational axis, said vertical rotational axis, said horizontal rotation actuator;
    said thruster portion is pivoted about said central axis by holding a portion of said riser being and pressing and pulling said pushing flap;
    said hinge plate actuator receiver backet is attached to said top surface forward of said hinge assembly;
    said hinged plate comprises said leading edge and said trailing edge;

said hinged plate is configured to further comprise said rotational aperture;

said rotational aperture comprises a hole being located proximate to said trailing edge and sized to rotateably hold a portion of said riser being of said axial mounting assembly, and allow said riser being to rotate about said central axis and said vertical rotational axis;

said thruster assembly comprises said hinged plate, said hinge assembly, said hinge plate actuator receiver backet, said horizontal rotational axis, said vertical rotational axis, said vertical rotation actuator, and said vertical actuator to thruster linkage;

said hinged plate is pivotably attached to a portion of said boat using said hinge assembly;

said thruster assembly and said hinged plate are configured to rotate about said horizontal rotational axis on said hinge assembly;

said hinge assembly is configured to allow said thruster assembly to be selectively removed or inserted into said water;

said vertical rotation actuator is configured to selectively push and pull portions of said thruster portion;

said vertical rotation actuator is configured to push and pull on said pushing flap to cause said thruster portion to selectively rotate about said central axis and said vertical rotational axis;

said vertical rotation actuator is rotateably attached to said pushing flap with said vertical actuator to thruster linkage;

said vertical rotation actuator is attached to said top surface of said hinged plate;

said thruster assembly is configured to rotate about said horizontal rotational axis between one or more horizontal rotary configurations so as to engage or disengage said thruster portion with said water under a portion of said boat; and said horizontal rotation actuator is configured to selectively push and pull on said hinge plate actuator receiver backet to cause said hinged plate to rotate about said hinge assembly on said horizontal rotational axis.

2. A thruster assembly to create shaped waves in a water behind a boat for water sports; wherein, said thruster assembly comprises a thruster portion;

said thruster assembly is configured to attach to a portion of said boat;

said thruster portion comprises an outer body comprising a rounded shape being elliptical in cross-section;

said outer body comprises a width, a height, and a depth;

said outer body comprises an outer surface and an inner surface;

said outer body encloses an internal channel between a leading end and a trailing end;

relative to a direction of travel for said boat in said water, said internal channel comprises said leading end and said trailing end;

said leading end and said trailing end are open and configured to direct the flow of water through said thruster portion as said thruster assembly is dragged through said water being attached to said boat;

said outer body comprises a top surface and a bottom surface, each being parts of said outer surface and a top inner surface and a lower inner surface being parts of said inner surface;

said leading end of said internal channel is configured to serve as an intake for said water and said trailing end is configured to expel said water out of said internal channel;

said thruster portion comprises one or more thrusting channels being arranged between said leading end and said trailing end;

said thruster portion is configured to be attached to said boat at a mounting angle relative to said direction of travel of said boat to alter a wake behind said boat; and said one or more thrusting channels comprise a plurality of channels formed by fluid directing channels within said outer body extending a portion of the distance between said leading end and said trailing end.

3. The thruster assembly of claim 2, wherein:

said one or more thrusting channels are configured to each comprise a first end, a second end, a channel body and a fluid channel between said first end and said second end.

4. The thruster assembly of claim 3, wherein:

said one or more thrusting channels are configured to attach to said inner surface within said internal channel.

5. The thruster assembly of claim 2, wherein:

said width is greater than said height of said outer body.

6. The thruster assembly of claim 5, wherein:

said outer body comprises with a ratio of said width to said height being approximately one to four.

7. The thruster assembly of claim 2, wherein:

an axial mounting assembly comprises a riser being substantially cylindrical, and a pushing flap extending radially out from a central axis of said riser being;

said thruster assembly comprises a hinged plate, a hinge assembly, a hinge plate actuator receiver backet, a horizontal rotational axis, a vertical rotational axis, a horizontal rotation actuator;

said thruster portion is pivoted about said central axis by holding a portion of said riser being and pressing and pulling said pushing flap;

said hinge plate actuator receiver backet is attached to a top surface forward of said hinge assembly;

said hinged plate comprises a leading edge and a trailing edge;

said hinged plate is configured to further comprise a rotational aperture; and said rotational aperture comprises a hole being located proximate to said trailing edge and sized to rotateably hold a portion of said riser being of said axial mounting assembly, and allow said riser being to rotate about said central axis and said vertical rotational axis.

8. The thruster assembly of claim 7, wherein:

a vertical rotation actuator is configured to selectively push and pull a rod between a plurality of lengths;

said plurality of lengths comprises at least a first length, a second length, and a third length;

a vertical actuator to thruster linkage is attached between said rod and said pushing flap;

said vertical rotation actuator is configured where extending said rod between said plurality of lengths, said vertical actuator to thruster linkage is configured to rotate said pushing flap about said central axis through a rotary path;

said vertical rotation actuator is configured to rotate about a rear axis and a curved attachment pin in order to allow said rod and said central axis to move about said rotary path without said vertical actuator to thruster linkage; and said curved attachment pin is configured to selectively slide into a linkage aperture of said pushing flap.

9. The thruster assembly of claim 2, wherein:
said thruster assembly comprises said hinged plate, said hinge assembly, said hinge plate actuator receiver backet, said horizontal rotational axis, said vertical rotational axis, said vertical rotation actuator, and said vertical actuator to thruster linkage;
said hinged plate is pivotably attached to a portion of said boat using said hinge assembly;
said thruster assembly and said hinged plate are configured to rotate about said horizontal rotational axis on said hinge assembly;
said hinge assembly is configured to allow said thruster assembly to be selectively removed or inserted into said water;
said vertical rotation actuator is configured to selectively push and pull portions of said thruster portion;
said vertical rotation actuator is configured to push and pull on said pushing flap to cause said thruster portion to selectively rotate about said central axis and said vertical rotational axis;
said vertical rotation actuator is rotateably attached to said pushing flap with said vertical actuator to thruster linkage; and
said vertical rotation actuator is attached to said top surface of said hinged plate.

10. The thruster assembly of claim 2, wherein:
said axial mounting assembly comprises said riser being substantially cylindrical, and said pushing flap extending radially out from said central axis of said riser being;
said thruster assembly comprises said hinged plate, said hinge assembly, said hinge plate actuator receiver backet, said horizontal rotational axis, said vertical rotational axis, said horizontal rotation actuator;
said thruster portion is pivoted about said central axis by holding a portion of said riser being and pressing and pulling said pushing flap;
said hinge plate actuator receiver backet is attached to said top surface forward of said hinge assembly;
said hinged plate comprises said leading edge and said trailing edge;
said hinged plate is configured to further comprise said rotational aperture;
said rotational aperture comprises a hole being located proximate to said trailing edge and sized to rotateably hold a portion of said riser being of said axial mounting assembly, and allow said riser being to rotate about said central axis and said vertical rotational axis;
said thruster assembly comprises said hinged plate, said hinge assembly, said hinge plate actuator receiver backet, said horizontal rotational axis, said vertical rotational axis, said vertical rotation actuator, and said vertical actuator to thruster linkage;
said hinged plate is pivotably attached to a portion of said boat using said hinge assembly;
said thruster assembly and said hinged plate are configured to rotate about said horizontal rotational axis on said hinge assembly;
said hinge assembly is configured to allow said thruster assembly to be selectively removed or inserted into said water;
said vertical rotation actuator is configured to selectively push and pull portions of said thruster portion;
said vertical rotation actuator is configured to push and pull on said pushing flap to cause said thruster portion to selectively rotate about said central axis and said vertical rotational axis;
said vertical rotation actuator is rotateably attached to said pushing flap with said vertical actuator to thruster linkage; and
said vertical rotation actuator is attached to said top surface of said hinged plate.

11. The thruster assembly of claim 10, wherein:
said thruster assembly is configured to rotate about said horizontal rotational axis between one or more horizontal rotary configurations so as to engage or disengage said thruster portion with said water under a portion of said boat; and
said horizontal rotation actuator is configured to selectively push and pull on said hinge plate actuator receiver backet to cause said hinged plate to rotate about said hinge assembly on said horizontal rotational axis.

12. The thruster assembly of claim 2, wherein:
said thruster assembly is attached to said boat;
said thruster assembly is attached to said boat with said mounting angle comprising a fixed angle relative to said direction of travel and said central axis;
a fixed thruster mounting assembly comprises a mounting bracket and a mounting arm;
said mounting bracket is configured to attach to a portion of said boat; and
said mounting arm is configured to attach to said mounting bracket at one end and a mount receiver at another end.

13. The thruster assembly of claim 12, wherein:
said mounting bracket comprises a first mounting bracket and a second mounting bracket;
said thruster assembly comprises said first mounting bracket attached proximate to said port side of said boat and said second mounting bracket attached proximate to said starboard side of said boat; and
said thruster assembly is moved between said fixed thruster mounting assembly to create a wake on either side of said boat.

14. The thruster assembly of claim 2, wherein:
said portion of said boat to which said thruster assembly is attached is selected among a stern portion, a port side, a starboard side, and a bottom portion of the hull.

15. A thruster assembly to create shaped waves in a water behind a boat for water sports; wherein,
said thruster assembly comprises a thruster portion;
said thruster assembly is configured to attach to a portion of said boat;
said thruster portion comprises an outer body comprising a rounded shape being elliptical in cross-section;
said outer body comprises a width, a height, and a depth;
said outer body comprises an outer surface and an inner surface;
said outer body encloses an internal channel between a leading end and a trailing end;
relative to a direction of travel for said boat in said water, said internal channel comprises said leading end and said trailing end;
said leading end and said trailing end are open and configured to direct the flow of water through said thruster portion as said thruster assembly is dragged through said water being attached to said boat;

said outer body comprises a top surface and a bottom surface, each being parts of said outer surface and a top inner surface and a lower inner surface being parts of said inner surface;

said leading end of said internal channel is configured to serve as an intake for said water and said trailing end is configured to expel said water out of said internal channel;

said thruster portion comprises one or more thrusting channels being arranged between said leading end and said trailing end;

said thruster portion is configured to be attached to said boat at a mounting angle relative to said direction of travel of said boat to alter a wake behind said boat;

said one or more thrusting channels comprise a plurality of channels formed by fluid directing channels within said outer body extending a portion of the distance between said leading end and said trailing end;

said width is greater than said height of said outer body;

said outer body comprises with a ratio of said width to said height being approximately one to four;

an axial mounting assembly comprises a riser being substantially cylindrical, and a pushing flap extending radially out from a central axis of said riser being;

said thruster assembly comprises a hinged plate, a hinge assembly, a hinge plate actuator receiver backet, a horizontal rotational axis, a vertical rotational axis, a horizontal rotation actuator;

said thruster portion is pivoted about said central axis by holding a portion of said riser being and pressing and pulling said pushing flap;

said hinge plate actuator receiver backet is attached to a top surface forward of said hinge assembly;

said hinged plate comprises a leading edge and a trailing edge;

said hinged plate is configured to further comprise a rotational aperture;

said rotational aperture comprises a hole being located proximate to said trailing edge and sized to rotateably hold a portion of said riser being of said axial mounting assembly, and allow said riser being to rotate about said central axis and said vertical rotational axis;

a vertical rotation actuator is configured to selectively push and pull a rod between a plurality of lengths;

said plurality of lengths comprises at least a first length, a second length, and a third length;

a vertical actuator to thruster linkage is attached between said rod and said pushing flap;

said vertical rotation actuator is configured where extending said rod between said plurality of lengths, said vertical actuator to thruster linkage is configured to rotate said pushing flap about said central axis through a rotary path;

said vertical rotation actuator is configured to rotate about a rear axis and a curved attachment pin in order to allow said rod and said central axis to move about said rotary path without said vertical actuator to thruster linkage; and said curved attachment pin is configured to selectively slide into a linkage aperture of said pushing flap.

16. The thruster assembly of claim 15, wherein:

said thruster assembly comprises said hinged plate, said hinge assembly, said hinge plate actuator receiver backet, said horizontal rotational axis, said vertical rotational axis, said vertical rotation actuator, and said vertical actuator to thruster linkage;

said hinged plate is pivotably attached to a portion of said boat using said hinge assembly;

said thruster assembly and said hinged plate are configured to rotate about said horizontal rotational axis on said hinge assembly;

said hinge assembly is configured to allow said thruster assembly to be selectively removed or inserted into said water;

said vertical rotation actuator is configured to selectively push and pull portions of said thruster portion;

said vertical rotation actuator is configured to push and pull on said pushing flap to cause said thruster portion to selectively rotate about said central axis and said vertical rotational axis;

said vertical rotation actuator is rotateably attached to said pushing flap with said vertical actuator to thruster linkage; and said vertical rotation actuator is attached to said top surface of said hinged plate.

17. The thruster assembly of claim 15, wherein:

said axial mounting assembly comprises said riser being substantially cylindrical, and said pushing flap extending radially out from said central axis of said riser being;

said thruster assembly comprises said hinged plate, said hinge assembly, said hinge plate actuator receiver backet, said horizontal rotational axis, said vertical rotational axis, said horizontal rotation actuator;

said thruster portion is pivoted about said central axis by holding a portion of said riser being and pressing and pulling said pushing flap;

said hinge plate actuator receiver backet is attached to said top surface forward of said hinge assembly;

said hinged plate comprises said leading edge and said trailing edge;

said hinged plate is configured to further comprise said rotational aperture;

said rotational aperture comprises a hole being located proximate to said trailing edge and sized to rotateably hold a portion of said riser being of said axial mounting assembly, and allow said riser being to rotate about said central axis and said vertical rotational axis;

said thruster assembly comprises said hinged plate, said hinge assembly, said hinge plate actuator receiver backet, said horizontal rotational axis, said vertical rotational axis, said vertical rotation actuator, and said vertical actuator to thruster linkage;

said hinged plate is pivotably attached to a portion of said boat using said hinge assembly;

said thruster assembly and said hinged plate are configured to rotate about said horizontal rotational axis on said hinge assembly;

said hinge assembly is configured to allow said thruster assembly to be selectively removed or inserted into said water;

said vertical rotation actuator is configured to selectively push and pull portions of said thruster portion;

said vertical rotation actuator is configured to push and pull on said pushing flap to cause said thruster portion to selectively rotate about said central axis and said vertical rotational axis;

said vertical rotation actuator is rotateably attached to said pushing flap with said vertical actuator to thruster linkage; and said vertical rotation actuator is attached to said top surface of said hinged plate.

18. The thruster assembly of claim 17, wherein:

said thruster assembly is configured to rotate about said horizontal rotational axis between one or more horizontal rotary configurations to engage or disengage said thruster portion with said water under a portion of said boat; and said horizontal rotation actuator is configured to selectively push and pull on said hinge plate actuator receiver backet to cause said hinged plate to rotate about said hinge assembly on said horizontal rotational axis.

19. The thruster assembly of claim 15, wherein:

said portion of said boat to which said thruster assembly is attached is selected among a stern portion, a port side, a starboard side, and a bottom portion of the hull.

* * * * *